US007254092B2

(12) United States Patent
DiNapoli

(10) Patent No.: US 7,254,092 B2
(45) Date of Patent: Aug. 7, 2007

(54) METHOD AND SYSTEM FOR SWIMMER DENIAL

(75) Inventor: Frederick R. DiNapoli, Westerly, RI (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 11/095,851

(22) Filed: Mar. 31, 2005

(65) Prior Publication Data

US 2005/0232084 A1 Oct. 20, 2005

Related U.S. Application Data

(60) Provisional application No. 60/562,859, filed on Apr. 16, 2004.

(51) Int. Cl.
*H04B 1/02* (2006.01)

(52) U.S. Cl. ....................................... 367/138; 367/139

(58) Field of Classification Search ................ 367/139, 367/138

See application file for complete search history.

(56) References Cited

U.S. PATENT DOCUMENTS 6,226,228 B1 5/2001 Hossack et al.
2001/0001603 A1 5/2001 Fink et al.
2005/0232084 A1* 10/2005 DiNapoli .................... 367/139

FOREIGN PATENT DOCUMENTS

WO WO 96/29933 10/1996

OTHER PUBLICATIONS

Kuperman et al.: "Phase conjugation in the Ocean: Experimental Demonstration of an Acoustic Time-Reversal Mirrors," Journal of the Acoustical Society of America, American Institute of Physics: vol. 103, No. 1: Jan. 1998.

Partial PCT Search Report received with Invatation to Correct Pay Additional Fees in PCT/US2005/010644, dated Sep. 8, 2005.

Dorme et al.: "Ultrasonic Beam Steering Through Inhomogeneous Layers with a Time Reversal Mirror;" 8104 IEEE Transactions on Ultrasonics Ferroelectrics and Frequency Control; 43 (1996); January, No. 1; XP 000557500; pp. 167-175.

PCT Search Report of the ISA for PCT/US2005/010644 dated Nov. 24, 2005.

Written Opinion of the ISA for PCT/US2005/010644 dated Nov. 24, 2005.

* cited by examiner

*Primary Examiner*—Daniel Pihulic
(74) *Attorney, Agent, or Firm*—Daly, Crowley, Mofford & Durkee, LLP

(57) ABSTRACT

A method and system for swimmer denial transmits underwater sound associated with a time-reversed impulsive response, resulting in amplified sound at a predetermined location. The amplified sound has sufficient peak pressure and/or impulse area to form a barrier to an underwater swimmer.

26 Claims, 14 Drawing Sheets

METHOD AND SYSTEM FOR SWIMMER DENIAL

CROSS REFERENCE TO RELATED APPLICATIONS

This application claims the benefit under 35 U.S.C. § 119(e) of U.S. Provisional Application No. 60/562,859 filed Apr. 16, 2004, which application is incorporated herein by reference in its entirety.

STATEMENT REGARDING FEDERALLY SPONSORED RESEARCH

Not Applicable.

FIELD OF THE INVENTION

This invention relates generally to acoustic systems and, more particularly, to a method and system using underwater sound to prevent a swimmer from approaching.

BACKGROUND OF THE INVENTION

There is a growing need to protect high value assets (HVAs) from approach by underwater swimmers. High value assets include, for example, ships, oil well platforms, and other facilities that can be approached by water.

Two issues generate the growing need. First, there is a fear that an underwater swimmer can damage or cause the HVA to malfunction via an explosive or other device. For example, a terrorist swimmer having a desire to do damage could place underwater explosives on the hull of a ship. Second, some military platforms are subject to underwater espionage. For example, a submarine has classified shapes and characteristics, for example, propeller shapes and characteristics, which can be observed by an underwater swimmer while the submarine is docked.

Active and passive sonar systems are known that can detect and classify underwater objects including underwater swimmers. However, mere detection and classification of an underwater swimmer does not prevent the underwater swimmer from approaching the HVA.

As is known, high peak pressure low frequency underwater sound can be uncomfortable, disorienting, incapacitating, or damaging to a swimmer, and in particular to an underwater swimmer, depending upon the frequency and the peak pressure of the underwater sound. The high peak pressure low frequency underwater sound not only can affect the hearing of an underwater swimmer, but can also affect the underwater swimmer's internal organs, causing pain, or even rupture.

As is also known, marine animals are also affected by loud underwater sounds. For example, active sonar systems used on some military ships are capable of producing low frequency sound of sufficient peak pressure to disorient or kill some marine mammals.

SUMMARY OF THE INVENTION

The present invention provides a system that can be used for swimmer denial adapted to protect a high value asset (HVA) in or near the water from approach by a swimmer. The system for swimmer denial has an underwater sound source for transmitting a predetermined waveform at a high sound pressure level (SPL) capable of generating amplified sound having a high peak pressure and/or a high impulse area (described more fully below) at a predetermined location away from the underwater sound source, while minimizing sound peak pressure and/or impulse area at other locations. The amplified sound can have characteristics such that, at the predetermined location, the amplified sound can be uncomfortable, disorienting, incapacitating, or damaging to the swimmer, while at other locations, the sound peak pressure is sufficiently low as to pose little threat to humans or marine mammals. Therefore, the amplified sound tends to stop the swimmer from approaching the high value asset, while posing reduced threat to marine life.

In accordance with the present invention, a system to provide amplified sound at a predetermined location includes an impulsive signal generator to provide an electrical impulsive signal. A first acoustic projector is coupled to the impulsive signal generator and disposed at a selected one of a first location and a second location to transmit an acoustic impulsive signal in accordance with the electrical impulsive signal. A hydrophone is disposed at the unselected one of the first location and the second location to provide a hydrophone signal in response to the acoustic impulsive signal. The system further includes a waveform processor to generate a time-reversed version of the hydrophone signal in accordance with a time-reversed acoustic impulsive response from the first location to the second location. A second acoustic projector is disposed at the first location to transmit an acoustic signal in accordance with the time-reversed version of the hydrophone signal, resulting in sound at the second location having at least one of a peak pressure substantially larger than a peak pressure apart from and proximate to the second location and an impulse area substantially larger than an impulse area apart from and proximate to the second location.

In accordance with another aspect of the present invention a method of generating amplified sound at a predetermined location includes generating an electrical impulsive signal, transmitting an acoustic impulsive signal at a selected one of a first location and a second location in accordance with the electrical impulsive signal, receiving sound pressure resulting from the acoustic impulsive signal at the unselected one of the first location and the second location, determining an acoustic impulsive response from the first location to the second location in accordance with the received sound pressure, time reversing the acoustic impulsive response, and transmitting an acoustic signal at the first location in accordance with the time-reversed acoustic impulsive response, resulting in sound at the second location having at least one of a peak pressure substantially larger than a peak pressure apart from and proximate to the second location and an impulse area substantially larger than an impulse area apart from and proximate to the second location.

In accordance with yet another aspect of the present invention, a system to provide amplified sound at a predetermined location includes a waveform processor to predict an acoustic impulsive response between a first location and a second location and to generate a time-reversed version of the acoustic impulsive response. The system also includes an acoustic projector disposed at the first location to transmit an acoustic signal in accordance with the time-reversed acoustic impulsive response, resulting in sound at the second location having at least one of a peak pressure substantially larger than a peak pressure apart from and proximate to the second location and an impulse area substantially larger than an impulse area apart from and proximate to the second location.

In accordance with yet another aspect of the present invention, a method of generating amplified sound at a predetermined location includes predicting an acoustic impulsive response between a first location and a second location, time reversing the acoustic impulsive response, and transmitting an acoustic signal at the first location in accordance with the time-reversed acoustic impulsive response, resulting in sound at the second location having at least one of a peak pressure substantially larger than a peak pressure apart from and proximate to the second location and an impulse area substantially larger than an impulse area apart from and proximate to the second location.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
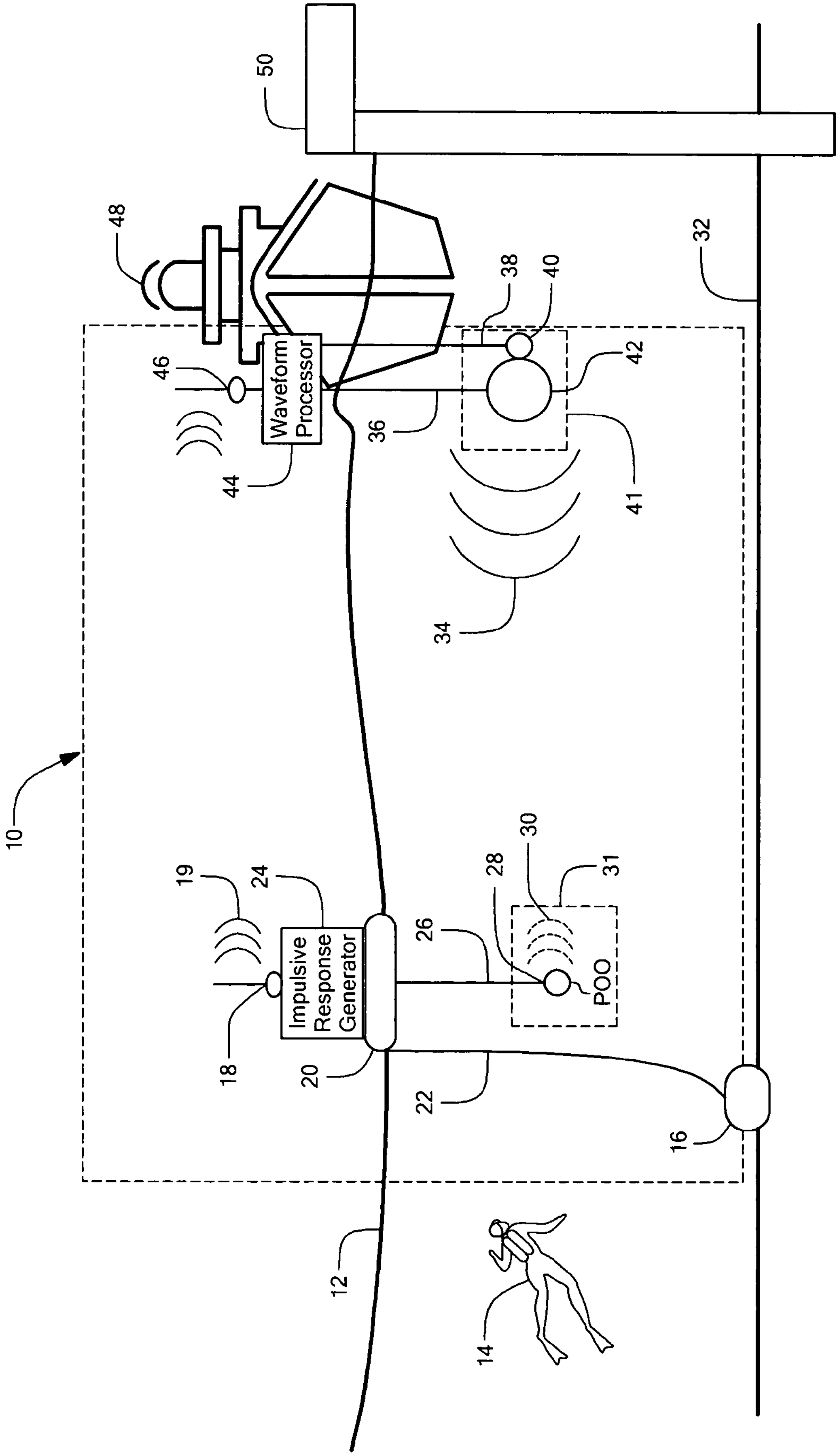
FIG. 1 is a diagram of a particular embodiment of a system for swimmer denial having a waveform processor.

Before describing a system for swimmer denial, some introductory concepts and terminology are explained. As used herein, the term "impulsive signal" is used to describe either an electrical signal or an acoustic signal that is impulsive in nature, but which is not necessarily a perfect impulse. As is known, a perfect impulse signal has an infinitely short time duration. Impulsive signals described herein have a finite time duration and particular amplitude characteristics described below. The impulsive signal can include, but is not limited to a signal having a sinc function amplitude characteristic, a signal having a Gaussian amplitude characteristic, and a short duration sinusoid.

As used here, the term "impulsive response" is used to describe a response of a medium to an impulsive signal. For example, as described below, an impulsive response between two locations in the ocean can be determined by transmitting an impulsive signal at one location and receiving a resulting signal at the other location.

As used herein, the term "impulse area" is used to describe an area under a curve corresponding to an amplitude characteristic of an impulsive signal. The area under the curve is determined from a level of a peak pressure down to a level corresponding to ambient noise, for example, ocean ambient noise. It will be appreciated, therefore, that the impulse area is related both to the peak pressure associated with the impulsive signal and to a time width or duration of the impulsive signal. It will be appreciated from discussion in conjunction with FIG. 3 and 3A that the duration (i.e., a width of the impulsive signal) should not exceed a smallest multipath time separation associated with multipath arrivals having the largest amplitudes.

As used herein, the term "amplified sound" refers to sound occurring in a region (also amplified region or amplified sound region) having a higher peak pressure and/or a higher impulse area than sound occurring at locations apart from and proximate to the amplified sound region.

As used herein, the phrase "point of origin" (POO) is used to refer to a location in water at which an acoustic impulsive signal is generated. The acoustic impulsive signal can be used to determine an acoustic transfer function (impulsive response) between a first location and a second location in the water. The first location corresponds to a location of a high-peak-pressure-acoustic projector (HPAP) and the second location corresponds to a predetermined location where amplified sound occurs.

In a first embodiment, the POO is at the second location, i.e., at the predetermined location where sound from the high-peak-pressure-acoustic projector is to be amplified, and the acoustic impulsive signal is transmitted from the POO toward the first location, which is the location of the high-peak-pressure-acoustic projector. The first embodiment is described in conjunction with FIG. 1 below.

In a second embodiment, the POO is at the first location, i.e. at the location of the high-peak-pressure-acoustic projector, and the acoustic impulsive signal is transmitted from the POO toward the second location, which is the predetermined location where amplified sound is to be provided. The second embodiment is described in conjunction with FIG. 1B below.

In both of the above-described embodiments, in order to determine the acoustic transfer function (impulsive response) between the first and second locations, an acoustic impulsive signal is generated at the POO. The POO can be at either the first location or the second location.

While the low-peak-pressure acoustic projector located at the POO is described below to generate a low peak pressure acoustic impulsive signal, it should be understood that, in other embodiments, the low-peak-pressure acoustic projector located at the POO can also generate a high peak pressure acoustic impulsive signal.

While a high-peak-pressure acoustic projector is described below to generate high peak pressure sound, amplified sound can also result at the predetermined location if the high-peak-pressure acoustic projector generates low peak pressure sound.

Referring to FIG. 1, a system for swimmer denial 10 can protect a high value asset (HVA) such as a ship 48 from approach by an underwater swimmer 14. The system for swimmer denial 10 includes a waveform processor 44 coupled to a high-peak-pressure-acoustic projector (HPAP) 42 at a first location 41 capable of transmitting a relatively high peak pressure time-reversed acoustic signal 34 into the water 12. In one particular embodiment, the high-peak-pressure-acoustic projector 42 is coupled to the waveform processor 44 with a cable 36.

Particular characteristics of the time-reversed acoustic signal 34 are described in greater detail in conjunction with FIGS. 3-4A, 6 and 7. Suffice it here to say, however, that the time-reversed acoustic signal 34 has characteristics such that, when projected into the water 12 by the acoustic projector 42, the time-reversed acoustic signal 34 causes the peak pressure and/or the impulse area of the sound received at a second (predetermined) location 31 apart from the high-peak-pressure-acoustic projector 42 to be relatively high, while the peak pressure and/or the impulse area of the sound received at other locations apart from and proximate to the predetermined location 31 is relatively low.

The system for swimmer denial 10 can also include a hydrophone 40 at the first location 41 coupled to the waveform processor 44. In one particular embodiment, the hydrophone 40 is coupled to the waveform processor 44 with a cable 38.

An impulsive signal generator 24 at the predetermined location 31 is coupled to a low-peak-pressure-acoustic projector 28, and is capable of generating an electrical impulsive signal to provide the low peak pressure acoustic impulsive signal 30 used to determine an acoustic transfer function between a point of origin (POO) at the second location 31 and the high-peak-pressure-acoustic projector 42 at the first location 41.

The impulsive signal generator 24 can be disposed on a float 20, which can be anchored to the ocean bottom 32, for example, with a cable 22 and an anchor 16. A radio frequency (RF) transmitter 18 can be coupled to the impulsive signal generator 24, and can send an RF signal 19 to the ship 48, where it is received with an RF receiver 46.

Characteristics of the time-reversed acoustic signal 34 are determined in accordance with the acoustic transfer function (impulsive response) between the second (predetermined) location 31 and the first location 41, which is the location of the high-peak-pressure-acoustic projector 42.

The transfer function (impulsive response) is generally reciprocal, i.e., the transfer function for sound generated at the predetermined location 31 and received at the first location 41 (e.g., by the hydrophone 40) tends to be the same as the transfer function for sound generated at the first location 41 and received at the second (predetermined) location 31. Therefore, in one particular embodiment, the transfer function can be determined by generating the low peak pressure acoustic impulsive signal 30 at the POO, which is at the predetermined location 31, with the low-peak-pressure-acoustic projector 28, and receiving resulting sound at the first location 41, for example, with the hydrophone 40.

The transfer function and the corresponding time-reversed acoustic signal 34 can be described mathematically. The sound pressure level received at the first location 41 (e.g., by the hydrophone 40) from a signal generated at the second location 31 by the low-peak-pressure-acoustic projector 28 can be written as:

$$\varphi(z, z_s, r_n, t) = 2\int_0^\infty H(z, z_s, r_n, f)F(f)e^{-i2\pi ft}\,df,$$

where F(f) is the low peak pressure acoustic impulsive signal 30 generated by the low-peak-pressure-acoustic projector 28, z is the depth of the high-peak-pressure-acoustic projector 42, $z_s$ is the depth of the low-peak-pressure-acoustic projector 28, $r_n$ is the horizontal range between the low-peak-pressure-acoustic projector 28 and the high-peak-pressure-acoustic projector 42 (i.e., the hydrophone 40), t is time, f is frequency, and H is the transfer function (impulsive response) for the propagation of sound from the low-peak-pressure-acoustic projector 28 to the high-peak-pressure-acoustic projector 42 (i.e., the hydrophone 40).

The sound pressure level of sound propagating in the other direction, i.e., from the high-peak-pressure-acoustic projector 42 to an arbitrary point at a horizontal distance $r_k$ from the high-peak-pressure-acoustic projector can be written as:

$$\varphi(z, z_s, r_k, t) = 2\int_0^\infty \hat{H}(z, z_s, r_k, f)\tilde{F}(z, z_s, r_k, f)e^{-i2\pi ft}\,df,$$

where $\tilde{F}(z,z_s,r_k,f)$ is a new source signal generated by the high-peak-pressure-acoustic projector, and $\hat{H}(z,z_s,r_k,f)$ is a transfer function from the high-peak-pressure-acoustic projector to the arbitrary point, $(z,z_s,r_k)$.

The signal $\tilde{F}(z,z_s,r_k,f)$, generated by the high-peak-pressure-acoustic projector 42 is:

$$\tilde{F}(z,z_s,r_n,f)=H^*(z,z_s,r_n,f)F^*(f)$$

where $H^*(z,z_s,r_n,f)$ is the complex conjugate of the transfer function $H(z,z_s,r_k,f)$ and F*(f) is the complex conjugate of the source signal F(f) originally generated by the low-peak-pressure-acoustic projector 28. The signal $\tilde{F}(z,z_s,r_n,f)$ will be understood to be a time-reversed version of the source signal F(f) originally generated by the low-peak-pressure-acoustic projector 28 as received at the hydrophone 40 at the location of the high-peak-pressure-acoustic projector 42.

It should be recognized that it is possible to generate any low peak pressure acoustic impulsive signal 30, F(f), with the low-peak-pressure-acoustic projector 28. However, only when the low peak pressure acoustic impulsive signal 30 transmitted by the low-peak-pressure-acoustic projector 28 is an impulsive signal will the result yield amplified sound at a desired location (i.e., at the predetermined location 31) having high peak pressure and/or a high impulse area and also reduced peak pressure and/or reduced impulse area away from that location.

It can be shown that a particular time-reversed acoustic signal 34 generated by the high-peak-pressure-acoustic projector 42 can result in a particularly high peak sound pressure level and/or a particularly high impulse area at the predetermined location 31, yet a spatial extent of the predetermined location 31 is relatively small. In other words, the amplified sound only exists in a small region, therefore reducing the possibility of harm to humans and marine mammals. The time-reversed acoustic signal 34 that results in these characteristics is a time-reversed version of the transfer function between the second (predetermined) location 31 and the first location 41, which is the location of the high-peak-pressure-acoustic projector 42. The impulsive response (or equivalently the transfer function) can be determined by generating the low peak pressure acoustic impulsive signal 30, and receiving the resulting acoustic signal with the hydrophone 40.

A received acoustic signal at the hydrophone 40 in response to the acoustic impulsive signal 30 includes a direct path signal along with a variety of reflections (multipath) of the acoustic impulsive signal 30, which are described below in conjunction with FIG. 2, and which together form the desired impulsive response. The nature of the time-reversed acoustic signal 34 will become more apparent in the discussion associated with FIGS. 3-4A below.

In order to determine the impulsive response (transfer function) described above, it is not practical or physically possible to generate a perfect impulse, which is know to have an infinitely short duration. However, a band limited pulse signal having an amplitude characteristic generally that of a sinc function can be used to approximate an impulse. It will be understood by one of ordinary skill in the art that a frequency domain equivalent of an impulse in the time domain is a flat (i.e., constant) frequency spectrum having infinite bandwidth. It also will be understood that if the flat frequency spectrum is filtered in the frequency domain so that the frequency spectrum is band limited, the resulting signal in the time domain is a sinc function ([sin(x)]/x). Therefore, the sinc function corresponds to a band limited flat frequency spectrum, and can be used to approximate an impulse. In one particular embodiment, the sinc function acoustic impulse is generated in accordance with a flat frequency spectrum band limited to a frequency below one kHz, for example 250 Hz.

Therefore, in operation, the impulsive signal generator 24 generates one or more electrical sinc functions (or generally impulsive signals) that are used to drive the low-peak-pressure-acoustic projector 28 to produce a low peak pressure acoustic impulsive signal 30. The acoustic impulsive signal 30 propagates through the water 12 via various acoustic paths and a version of the acoustic impulsive signal 30 associated with each of those paths is received by the hydrophone 40. A total received signal received by the hydrophone 40 has a duration longer than the originally transmitted acoustic impulsive signal 30.

The waveform processor 44 can analyze the signal received by the hydrophone 40 to determine the transfer function, i.e., a band limited impulsive response in the time domain, of the acoustic channel formed between the second (predetermined) location 31 and the first location 41, which is the location of the high-peak-pressure-acoustic projector 42. The waveform processor 44 can also generate a time-reversed electrical signal in accordance with a time-reversed version of the impulsive response. The high-peak-pressure-acoustic projector 42 can generate the time-reversed acoustic signal 34 in accordance with the time-reversed electrical signal. The waveform processor 44 is described in greater detail in conjunction with FIG. 1A. As described above, the high-peak-pressure-acoustic projector 42 transmits the time-reversed version of the impulsive response between the first location 41 and the second (predetermined) location 31, which results in amplified sound having a relatively high peak pressure and/or a large impulse area at the predetermined location 31 and reduced sound peak pressure and/or impulse area away from and proximate to the predetermined location 31.

As described above, it should be recognized that the time-reversed acoustic signal 34 is not impulsive in nature, i.e., it generally has a substantial time extent. However, it will also be recognized that when the time-reversed acoustic signal 34 arrives at the predetermined location 31, it is generally impulsive in nature, having relatively short time duration. These characteristics will become more apparent below, in the discussion of FIGS. 2-4.

In one particular embodiment, the high-peak-pressure-acoustic projector 42 generates one time-reversed acoustic signal 34. In other embodiments, the high-peak-pressure-acoustic projector 42 generates more than one time-reversed acoustic signal 34 with a repetition rate, for example, one Hz.

The low-peak-pressure acoustic projector 28 can generate the acoustic impulsive signal 30 having a peak sound pressure level in the range of one hundred sixty to two hundred fifteen dB re 1 μPa. The high-peak-pressure acoustic projector 42 can generate the time-reversed acoustic signal 34 having a peak sound pressure level in the range of one hundred sixty to two hundred fifteen dB re 1 μPa. In some embodiments, the amplified sound in the predetermined location 31 can have a peak pressure at least 3 dB above regions apart from and proximate to the predetermined location. In some embodiments the second location 31 is separated from the first location 41 by at least ten meters and the sound peak pressure at the second location 31 is at least 185 dB re 1 μPa.

The predetermined location 31 in which sound is amplified can have a continuous or discontinuous azimuth extent about the high-peak-pressure acoustic projector 42 in accordance with ocean bottom characteristics that are the generally the same in azimuth about the high-peak-pressure acoustic projector 42. The ocean bottom characteristics include, but are not limited to depth, slope, and bottom type (e.g., rock, sand, etc.).

While the system for swimmer denial 10 is described to have one anchored float 20 with the low-peak-pressure-acoustic projector 28, the impulsive signal generator 24, and the RF transmitter 18, and also one second (predetermined) location 31, in other embodiments, more than one float with associated low low-peak-pressure-acoustic projectors, impulsive signal generators, and RF transmitters can be used to provide more than one location having amplified sound. For example, in one particular embodiment, twelve floats, each with an associated low-peak-pressure-acoustic projector, impulsive signal generator, and RF transmitter can be used, each of which can be positioned at different ranges and/or at different azimuths relative to the ship 48. Having the twelve low-peak-pressure-acoustic projectors, the waveform processor 44 can receive twelve corresponding acoustic signals and can generate twelve transfer functions (impulsive responses) and twelve electrical signals accordingly, each associated with a time-reversed version of an impulsive response between a respective one of the twelve low-peak-pressure-acoustic projectors and the hydrophone 40. Therefore, the high-peak-pressure-acoustic projector can generate twelve time-reversed acoustic signals, resulting in amplified sound at twelve predetermined locations. The twelve acoustic signals can be generated together at the same time within one signal or sequentially, and can tend to form one or more barriers to an underwater swimmer. In other embodiments, more than twelve or fewer than twelve low-peak-pressure acoustic projectors can be provided.

In still another embodiment, more than one low-peak-pressure-acoustic projector 28 can be suspended from the cable 26, and the more than one low-peak-pressure-acoustic projector are, therefore, substantially vertically aligned at different depths in the water 12 to provide more than one depth aligned location having amplified sound. For example, in one particular embodiment, the system for swimmer denial 10 can include twelve vertically aligned low-peak-pressure-acoustic projectors. Having twelve low-peak-pressure-acoustic projectors, the waveform processor 44 can receive twelve signals and can generate twelve transfer functions (impulsive responses) and twelve corresponding electrical signals accordingly, each associated with a time-reversed version of an impulsive response (or received pressure from an impulsive signal) between a respective one of the twelve low-peak-pressure-acoustic projectors and the hydrophone 40. Therefore, the high-peak-pressure-acoustic projector can generate twelve time-reversed acoustic signals, resulting in amplified sound at twelve vertically aligned predetermined locations. The twelve acoustic signals can be generated together at the same time within one signal or sequentially, and tend to form a vertical barrier also with azimuth extent to an underwater swimmer. In other embodiments, more than twelve or fewer than twelve low-peak-pressure-acoustic projectors can be provided.

In yet another embodiment, twelve hydrophones (e.g., 40), each with an associated waveform processor (e.g., 160), can be positioned at different ranges, and/or at different azimuths, and/or at different depths relative to the ship 48. Having the twelve hydrophones, each associated waveform processor can each generate a respective one of twelve transfer functions and a respective one of twelve electrical signals accordingly, each associated with a time-reversed version of an impulsive response between a respective one of the twelve hydrophones and the low-peak-pressure-acoustic projector 28. With this arrangement, a high-peak-pressure-acoustic projector can be disposed at one or more of the twelve hydrophone locations, and each can generate a time-reversed acoustic signal according to its respective transfer function to the predetermined location 31, resulting in amplified sound at the predetermined location 31. In other embodiments, more than twelve of fewer than twelve hydrophones and high-peak-pressure-acoustic projectors can be provided.

In the above embodiment having twelve high-peak-pressure acoustic projectors, in one particular arrangement, the twelve high-peak-pressure-acoustic projectors each generate a respective time-reversed acoustic signal 34, each properly time delayed so that they add constructively at the predetermined location 31 to provide a very high peak pressure impulsive signal at the predetermine location 31. In another arrangement, the twelve high-peak-pressure-acoustic projectors each generate a respective time-reversed acoustic signal 34, each properly time delayed so that they arrive at the predetermined location 31 at different times to provide a plurality of high peak pressure signals (having a repetition rate) at the predetermined location 31, for example, having a repetition rate between forty-five Hz an one hundred seventy Hertz. In yet another arrangement, the twelve high-peak-pressure-acoustic projectors each generate a respective time-reversed acoustic signal 34, each properly time delayed to provide a longer duration, non-impulsive, high peak pressure signal received at the predetermined location 31. In other arrangements, one or more of the twelve high-peak-pressure acoustic projectors can generate more than one time-reversed acoustic signal 34.

As described above, it will be appreciated that the above-described time delays applied to the twelve high-peak-pressure acoustic projectors can result in: a) a very high peak pressure impulsive signal received at the second (predetermined) location 31, b) a plurality of high peak pressure impulsive signals (having a repetition rate) received at the second (predetermined) location 31, or c) a long time duration during which amplified sound is received at the second (predetermined) location 31. In some embodiments a duration of sound appearing at the second location 31 is between 120 and 360 msec.

In each of the arrangements described above having twelve high-peak-pressure acoustic projectors, the resulting signal received at the predetermined location 31 can be tailored based upon the impulse area of the acoustic impulsive signal 30 used to derive the transfer function (impulsive response) between the first location 41 and the second location 31. For example, for the arrangement where the twelve high-peak-pressure acoustic projectors are each properly time delayed so that they add constructively at the predetermined location 31, if the impulse area of the impulsive signal 30 used to derive the transfer function (impulsive response) is tailored to have a short duration, then the transmitted time-reversed acoustic signal 34 results in a short duration signal received at the predetermined location 31. Conversely, if the impulse area of the impulsive signal 30 used to derive the transfer function is tailored to have a longer duration, then the associated time-reversed acoustic signal 34 results in a longer duration signal received at the predetermined location 31. In this way, the signal received at the predetermined location can be tailored to have a predetermined duration with a value corresponding to the time difference between the highest amplitude multipath arrivals, for example, about ten to thirty milliseconds.

Each of the above signals has particular effects upon a swimmer. For example, the signal having the repetition rate can be used to excite resonances within organs of the swimmer, resulting in damaging physiological resonance effects. For another example, a single impulsive signal can cause the rupture of vital organs if it has sufficiently high peak pressure and impulse area.

While the transfer function between the POO and the high-peak-pressure-acoustic projector 42 has been described to be acquired by generating the acoustic impulsive signal 30 from the second (predetermined) location 31 to the first location 41, i.e., to the hydrophone 40, it will be understood that the transfer function is substantially reciprocal. Therefore, in another embodiment described below in conjunction with FIG. 1B, the transfer function can equally well be acquired by generating the acoustic impulsive signal 30 from the first location 41 to the second (predetermined) location 31. For either direction of low power acoustic impulse propagation and transfer function determination, the received sound follows a number of acoustic paths as described in conjunction with FIG. 2.

In yet another embodiment, however, the impulsive response can be predicted rather than measured. As is known, with knowledge of a sound velocity profile, water column depth, sound frequency, grazing angles, surface roughness, bottom roughness, and bottom type, it is possible to generate acoustic models that can predict sound propagation. Therefore, the impulsive response can be predicted rather than measured if some or all of those parameters are known. This particular arrangement is described in FIGS. 1D and 1E.

While the low-peak-pressure-acoustic projector 28 has been described to be supported by the anchored float 20, in other embodiments, the low-peak-pressure-acoustic projector 28 is only temporarily placed at the predetermined location 31. For example, the low-peak-pressure-acoustic projector 28 can be temporarily placed at the predetermined location 31 by a small surface vessel while the impulse transfer function is determined.

The system for swimmer denial 10 can have different modes of operation. For example, the predetermined location 31 can be relatively close to the ship 48, for example, twenty-nine meters from the ship 48. Such a short-range predetermined location 31 can, for example, be used in a non-alerted mode in which the time-reversed high peak pressure sound 34 is generated continuously or intermittently without knowledge of the presence of the underwater swimmer. The short-range predetermined location 31 provides a barrier to the underwater swimmer, while providing a reduced likelihood of harm to marine animals.

In another mode of operation, another sonar system (not shown) can provide a detection of an underwater swimmer, at which time the system for swimmer denial 10 can either turn on or can switch from the non-alerted mode described above to an alerted mode. In the alerted mode, the system for swimmer denial 10 can generate the predetermined location 31 relatively far from the ship 48, for example, five hundred three meters from the ship 48, providing a long range barrier to an incoming underwater swimmer.

While the low peak pressure acoustic impulsive signal 30 is described above to be a sinc function, in other embodiments, the low peak pressure acoustic impulsive signal 30 is any impulsive signal, including, but not limited to, a signal having a Gaussian amplitude characteristic, and a short duration sinusoid.

Figure 1A:
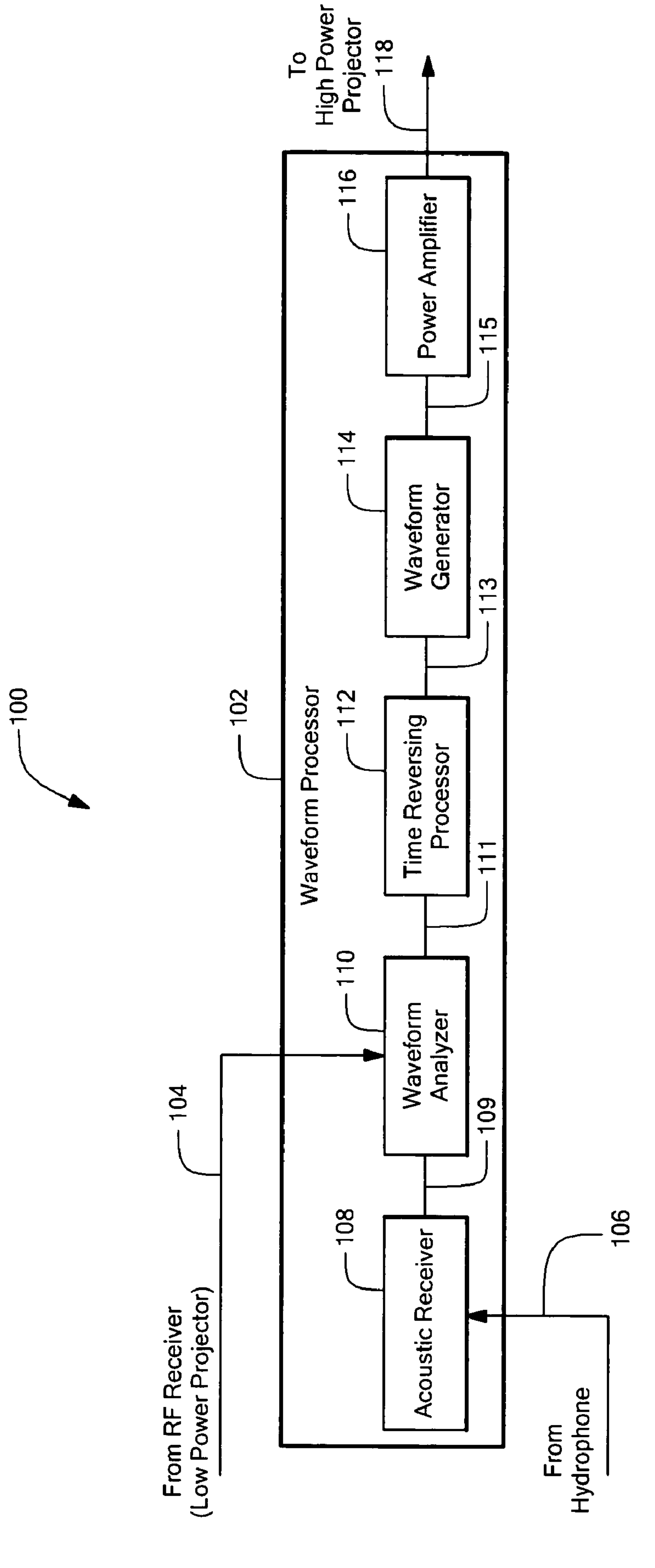
FIG. 1A is block diagram showing further details of the waveform processor of FIG. 1.

Referring now to FIG. 1A, an exemplary waveform processor 100, which may be similar, for example, to the waveform processor 44 shown in FIG. 1, includes an acoustic receiver 108 adapted to receive signals 106 from a hydrophone, for example the hydrophone 40 of FIG. 1. The waveform processor 100 also includes a waveform analyzer 110, a time reversing processor 112, a waveform generator 114, and an amplifier 116.

In operation, the hydrophone signals 106 are provided to the acoustic receiver 108, where they are amplified and filtered appropriately. The waveform analyzer 110 receives an amplified hydrophone signal 109 from the acoustic receiver 108 and a timing signal 104 from an RF receiver, for example, the RF receiver 46 of FIG. 1, and analyzes the amplified hydrophone signal 109. For example, in one particular embodiment, the waveform analyzer 110 samples and digitizes the amplified hydrophone signal 109. The timing signal 104 can be sent to the RF receiver via an RF transmitter (for example, the RF transmitter 18 of FIG. 1).

The waveform analyzer 110 provides a digitized hydrophone signal 111 to a time-reversing processor 112, which time-reverses the digitized hydrophone signal 111 to provide a time-reversed digitized hydrophone signal 113. For example, in one particular embodiment, the time reversing processor 112 can time reverse a series of digitized samples of the digitized hydrophone signal 111 provided by the waveform analyzer 110.

The waveform generator 114 receives the time-reversed digitized hydrophone signal 113 and provides a time-reversed analog signal 115. For example, in one particular embodiment, the waveform generator 114 converts the time-reversed digitized hydrophone signal 113 provided by the time reversing processor 112 into the time-reversed analog signal 115. The amplifier 116 boosts the amplitude of the time-reversed analog signal 115 provided by the waveform generator 114. An amplified signal 118 is provided to a high-peak-pressure-acoustic projector, for example, the high-peak-pressure-acoustic projector 42 of FIG. 1.

With the above arrangement, the waveform processor 100 both determines the impulsive response described above in conjunction with FIG. 1 and generates an amplified time-reversed signal accordingly, which is sent to the high-peak-pressure-acoustic projector 42.

The waveform processor 100 is preferably used in a system such as that shown in FIG. 1, in which the impulsive response is determined by projecting acoustic impulsive signals 30 from the predetermined location 31 (FIG. 1) to the first position 41 (FIG. 1),o i.e., to the hydrophone 40. In such an embodiment, therefore, the POO is at the second (predetermined) location 31.

Figure 1B:
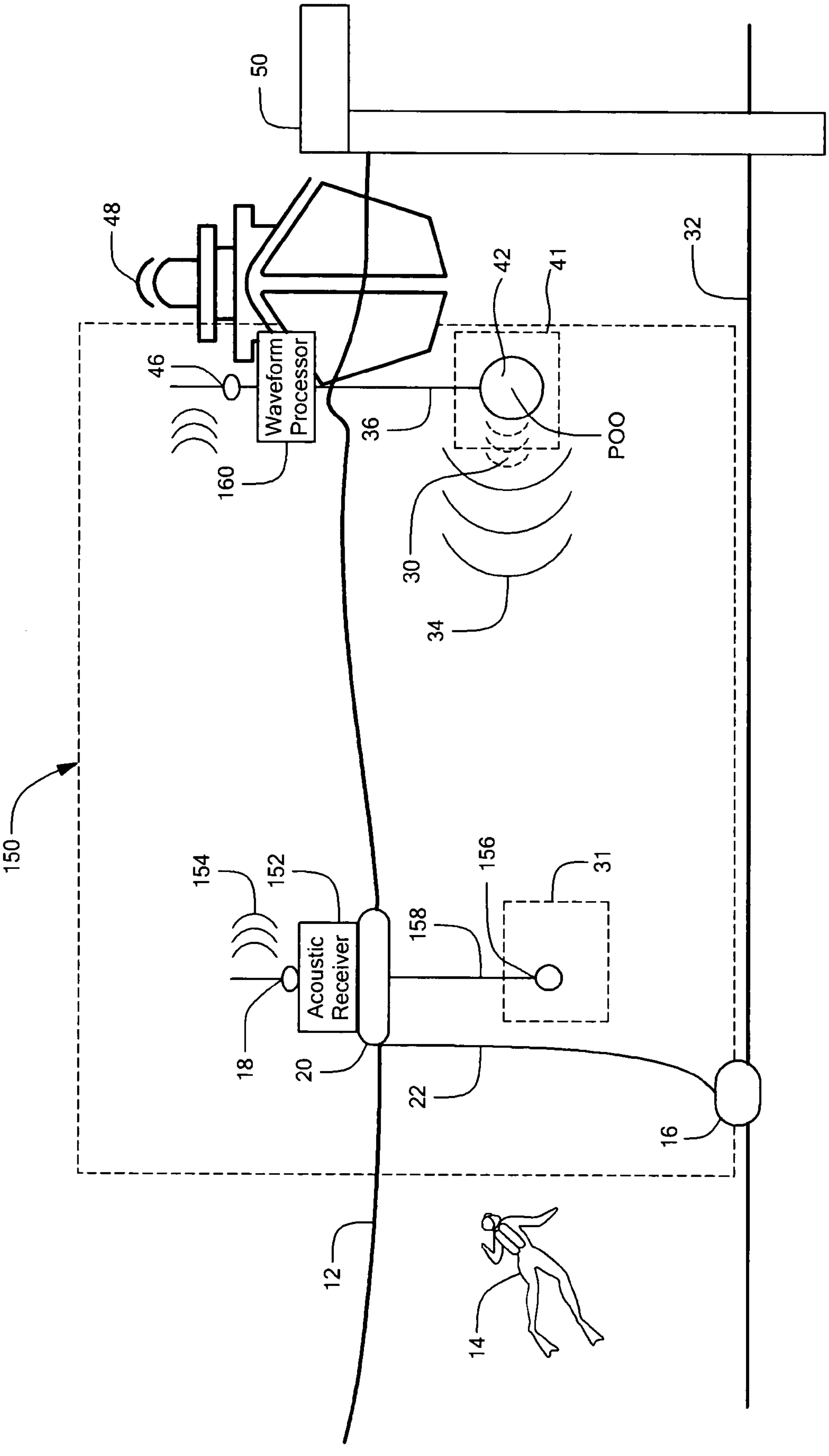
FIG. 1B is a diagram of an alternate embodiment of the system for swimmer denial having a waveform processor.

Referring now to FIG. 1B, in which like elements of FIG. 1 are shown having like reference designations, the low peak pressure acoustic impulsive signal 30 is generated by the high-peak-pressure-acoustic projector 42 at the first location 41 (POO), or alternately, by a low-peak-pressure-acoustic projector (not shown) at the first location 41 proximate to the high-peak-pressure-acoustic projector 42, in a direction opposite the direction shown in FIG. 1. The low peak pressure acoustic impulsive signal 30 travels along a variety of acoustic paths further described in conjunction with FIGS. 2-4A, which arrive at a hydrophone 156. The hydrophone 156 provides a corresponding hydrophone signal to an acoustic receiver 152. The hydrophone signal is transmitted, for example, with the RF transmitter 18, as an RF signal 154 to the RF receiver 46. The RF signal 154 is received by the RF receiver 46, which converts the RF signal 154 back to a replica of the hydrophone signal that is processed by a waveform processor 158. The waveform processor 158 is further described in conjunction with FIG. 1C below.

Figure 1C:
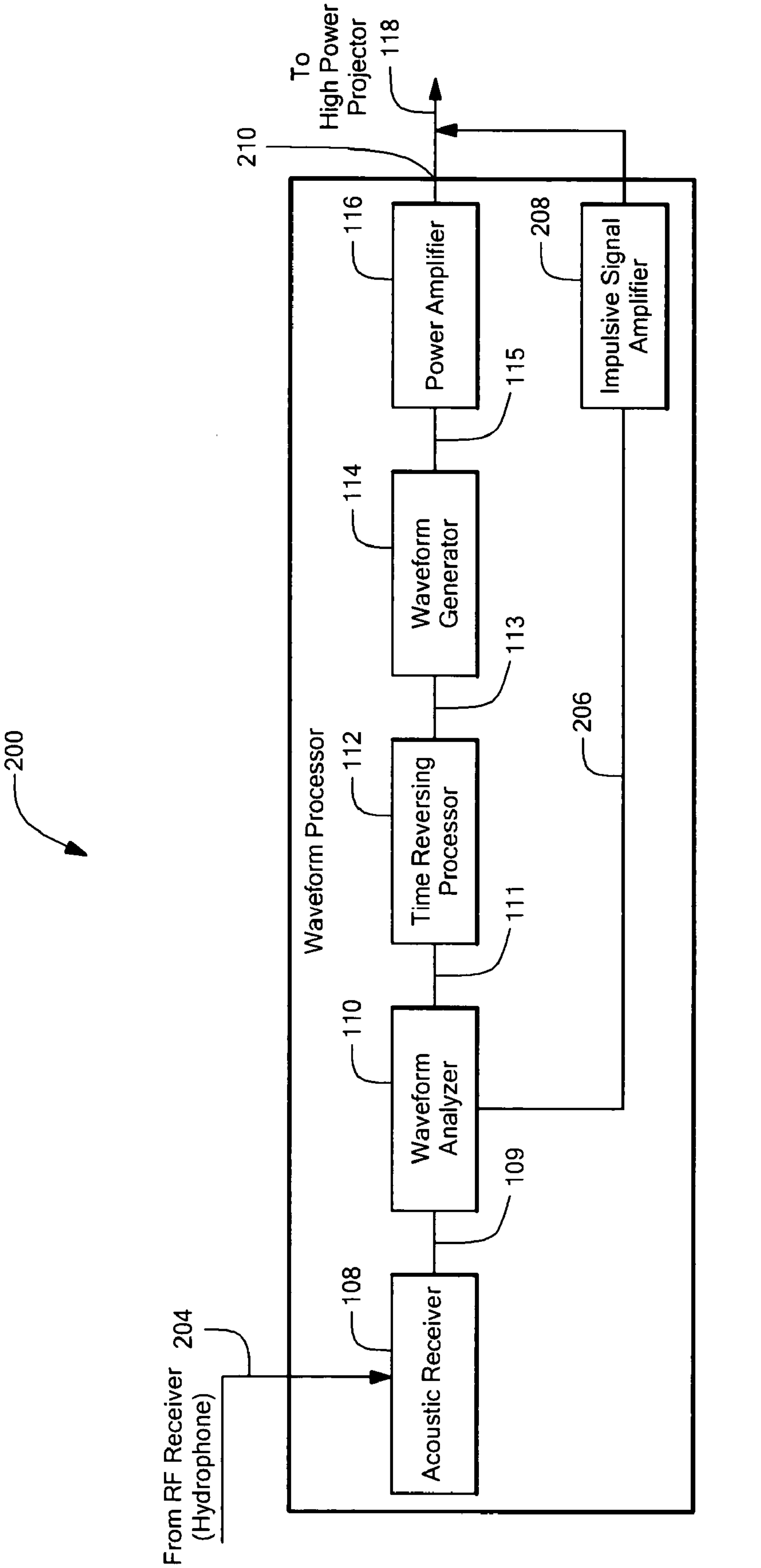
FIG. 1C is block diagram showing further details of the waveform processor of FIG. 1B.

Referring now to FIG. 1C, in which like elements of FIG. 1A are shown having like reference designations, an exemplary waveform processor 200, which may be similar, for example, to the waveform processor 160 shown in FIG. 1A, receives a replica of the hydrophone signal 204 from the RF receiver 46 (FIG. 1B). The hydrophone signal 204 can be associated, for example, with the RF signal 154 (FIG. 1B). Processing of the replica of the hydrophone signal 204 by the waveform processor 200 is done substantially as described above in conjunction with FIG. 1A. However, the waveform processor 200 can include an impulsive signal generator 208 coupled between the waveform analyzer 110 and an output port 210 of the waveform processor 200. The impulsive signal generator 208, which can be similar, for example, to the impulsive signal generator 24 shown in FIG. 1, generates the low peak pressure acoustic impulsive signals (sinc function signals) with the high-peak-pressure-acoustic projector 42 (FIG. 1B) or, alternatively, with a low-peak-pressure-acoustic projector (not shown) proximate the high-peak-pressure-acoustic projector. The low peak pressure acoustic impulsive signals can be the same as or similar to the acoustic impulsive signal 30 of FIG. 1B. A timing signal 206 can be provided to the waveform analyzer 110 by the impulsive signal generator 208.

The waveform processor 200 is preferably used in a system such as that shown in FIG. 1B, in which the impulsive response is determined by projecting acoustic impulsive signals 30 in the opposite direction from the system shown in FIG. 1, i.e., from the position of the high-peak-pressure-acoustic projector 42 (FIG. 1B) to the hydrophone 156 at the predetermined location 31 (FIG. 1B). In such an embodiment, therefore, the POO is at the position of the high-peak-pressure-acoustic projector 42.

Figure 1D:
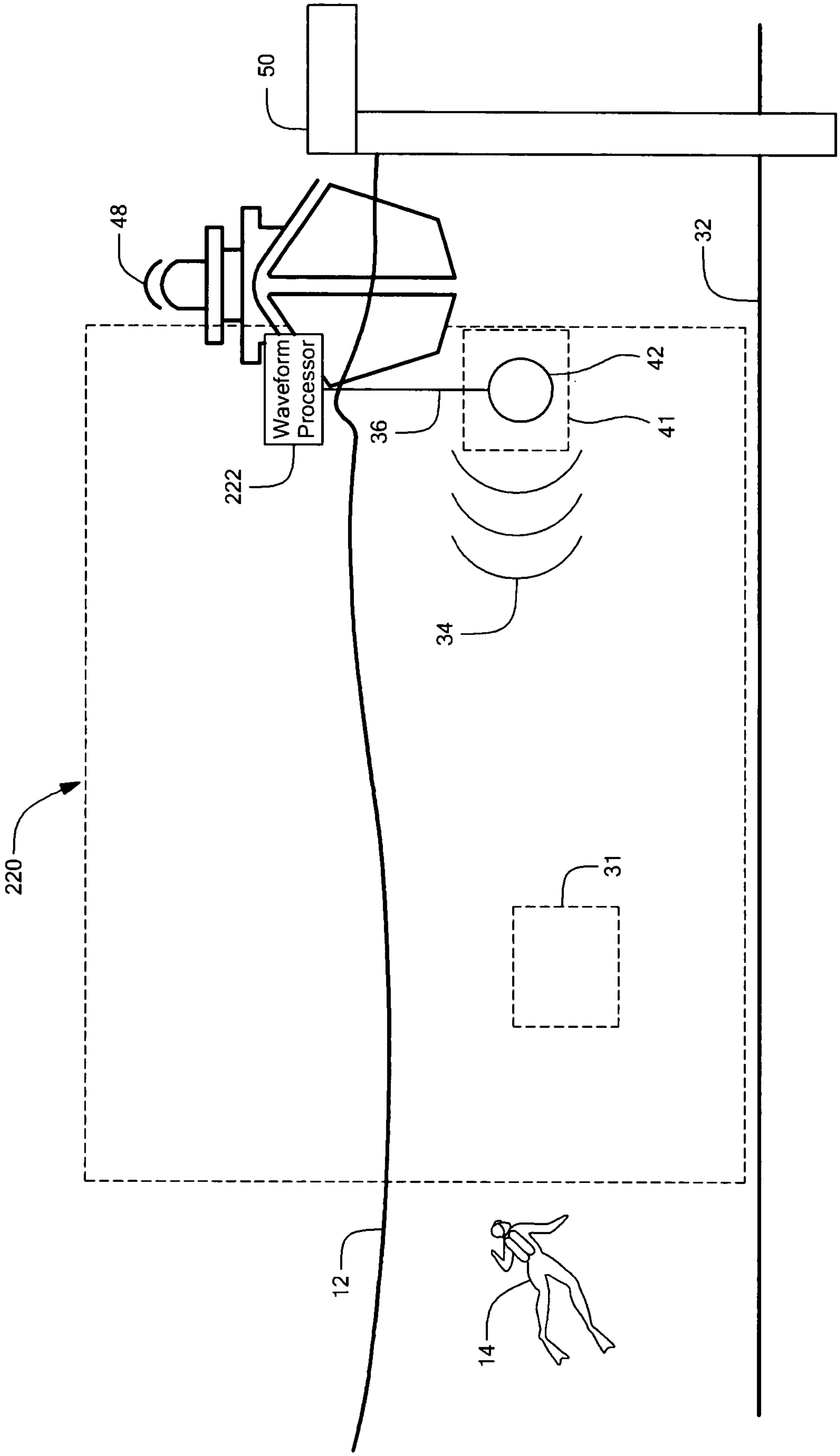
FIG. 1D is a diagram of another alternate embodiment of the system for swimmer denial having a waveform processor.

Referring now to FIG. 1D, in which like elements of FIG. 1 are shown having like reference designations, a system 220 for swimmer denial includes the high-peak-pressure acoustic projector 42 at the first location 41. The high-peak-pressure acoustic projector 42 is coupled to a waveform processor 222 with the cable 36. As described above, the impulsive response between the first location and the second location 31 can be predicted rather than measured (by the waveform processor 222). Therefore, other elements of FIG. 1, used to measure the impulsive response, are not required in the system 220.

Figure 1E:
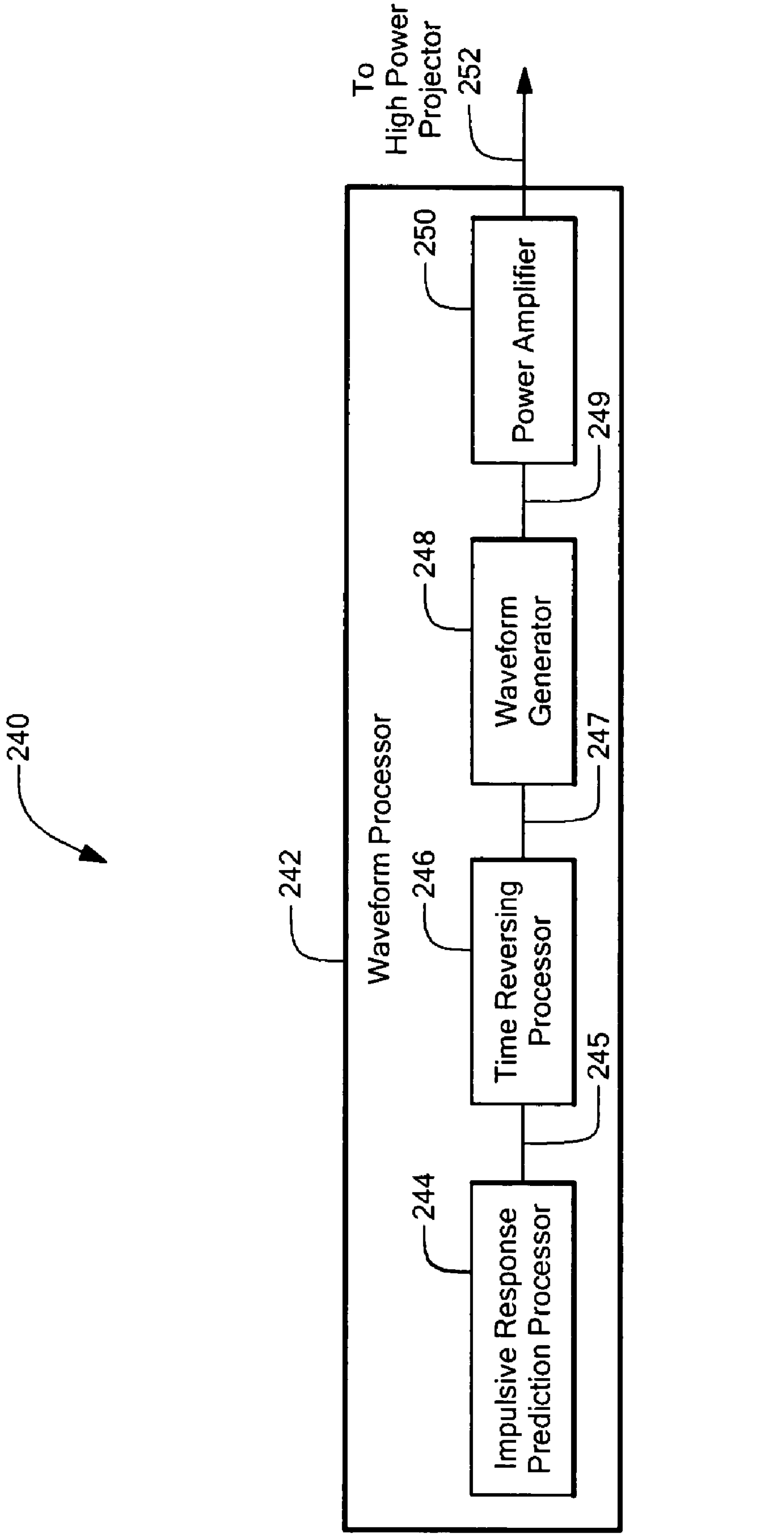
FIG. 1E is a block diagram showing further details of the waveform processor of FIG. 1D.

Referring now to FIG. 1E, an exemplary waveform processor 240, which may be similar, for example, to the waveform processor 222 shown in FIG. 1D, includes an impulsive response prediction processor 244. The impulsive response prediction processor 244 is adapted to predict an impulsive response, for example, the impulsive response between the first location 41 and the second location 31 of FIG. 1D. The prediction is based upon a variety of factors, including, but not limited to the sound velocity profile, the water column depth versus range between the first location 41 and the second location 31 of FIG. 1D, the sound frequency, the grazing angles, the surface roughness, the bottom roughness, and the bottom type.

In operation, the impulsive response prediction processor 244 generates a digitized signal 245 in accordance with the impulsive response. A time-reversing processor 246 time-reverses the digitized signal 245 to provide a time-reversed digitized signal 247.

A waveform generator 248 receives the time-reversed digitized signal 247 and provides a time-reversed analog signal 249. An amplifier 250 boosts the amplitude of the time-reversed analog signal 249 provided by the waveform generator 248. An amplified signal 252 is provided to a high-peak-pressure-acoustic projector, for example, the high-peak-pressure-acoustic projector 42 of FIG. 1.

With the above arrangement, the waveform processor 242 both predicts the impulsive response described above in conjunction with FIG. 1 and generates an amplified time-reversed signal accordingly, which is sent to the high-peak-pressure-acoustic projector 42.

The waveform processor 240 is preferably used in a system such as that shown in FIG. 1D, in which the impulsive response is predicted.

Figure 2:
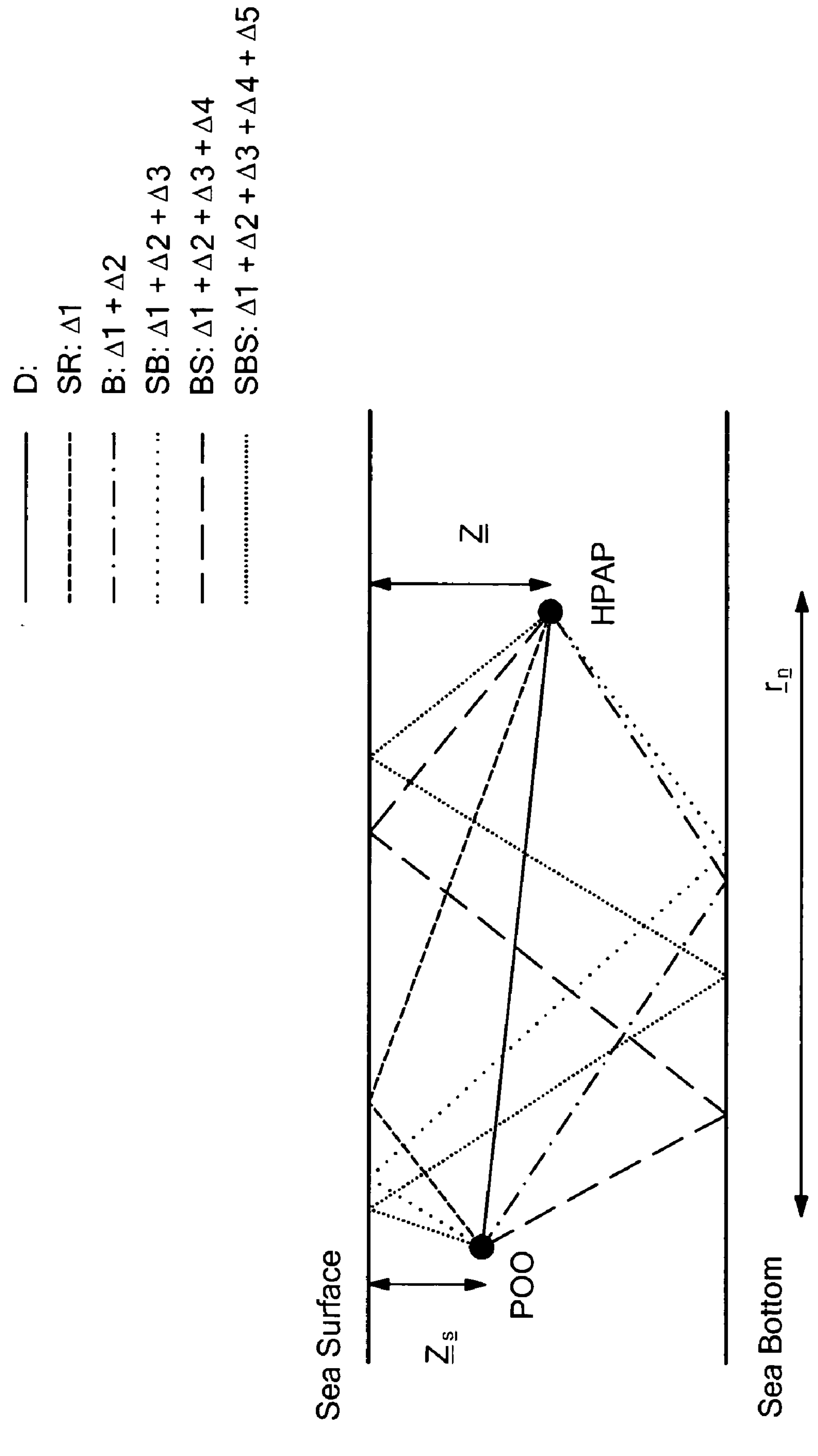
FIG. 2 is a diagram showing a variety of sound paths between a point of origin (POO) and a position of a high-peak-pressure-acoustic projector (HPAP)

Referring now to FIG. 2, a sea surface and a sea bottom form a channel between two locations, for example, between a second location (POO) and a first location (location of a high-peak-pressure-acoustic projector, HPAP). These positions can correspond, for example, to the second (predetermined) location 31 (which is also the POO) and the first location 41, which is the location of the high-peak-pressure-acoustic projector (HPAP) 42 of FIG. 1. The point of origin (POO) and the high-peak-pressure-acoustic projector can be at different depths within the channel, and are separated by a horizontal range $r_n$. As described above in conjunction with FIG. 1, the low-peak-pressure-acoustic projector 28 can generate an acoustic impulsive signal 30 (FIG. 1) at the POO in order to acquire an impulsive response between the predetermined location 31 and the high-peak-pressure-acoustic projector 42.

Sound paths include, but are not limited to, a direct (D) path, a surface reflected (SR) path, a bottom (B) path, a surface-bottom (SB) path, a bottom-surface (BS) path, and a surface-bottom-surface (SBS) path. While other paths are formed having a greater number of surface and bottom bounces, it is known that the peak pressure of sound is generally reduced in direct proportion to the number of bottom and surface bounces. Therefore, for clarity, paths with a greater number of bounces are not shown. As shown in FIG. 2, each of the paths is associated, with a different time delay indicated by Δ numbers. Therefore, the total received sound arriving at the position of the HPAP includes a plurality of sound pulses or a time stretched sound pulse, depending upon the duration of the originally transmitted sound impulse. The nature of each received pulse will be become more apparent in conjunction with FIG. 3.

Figure 5:
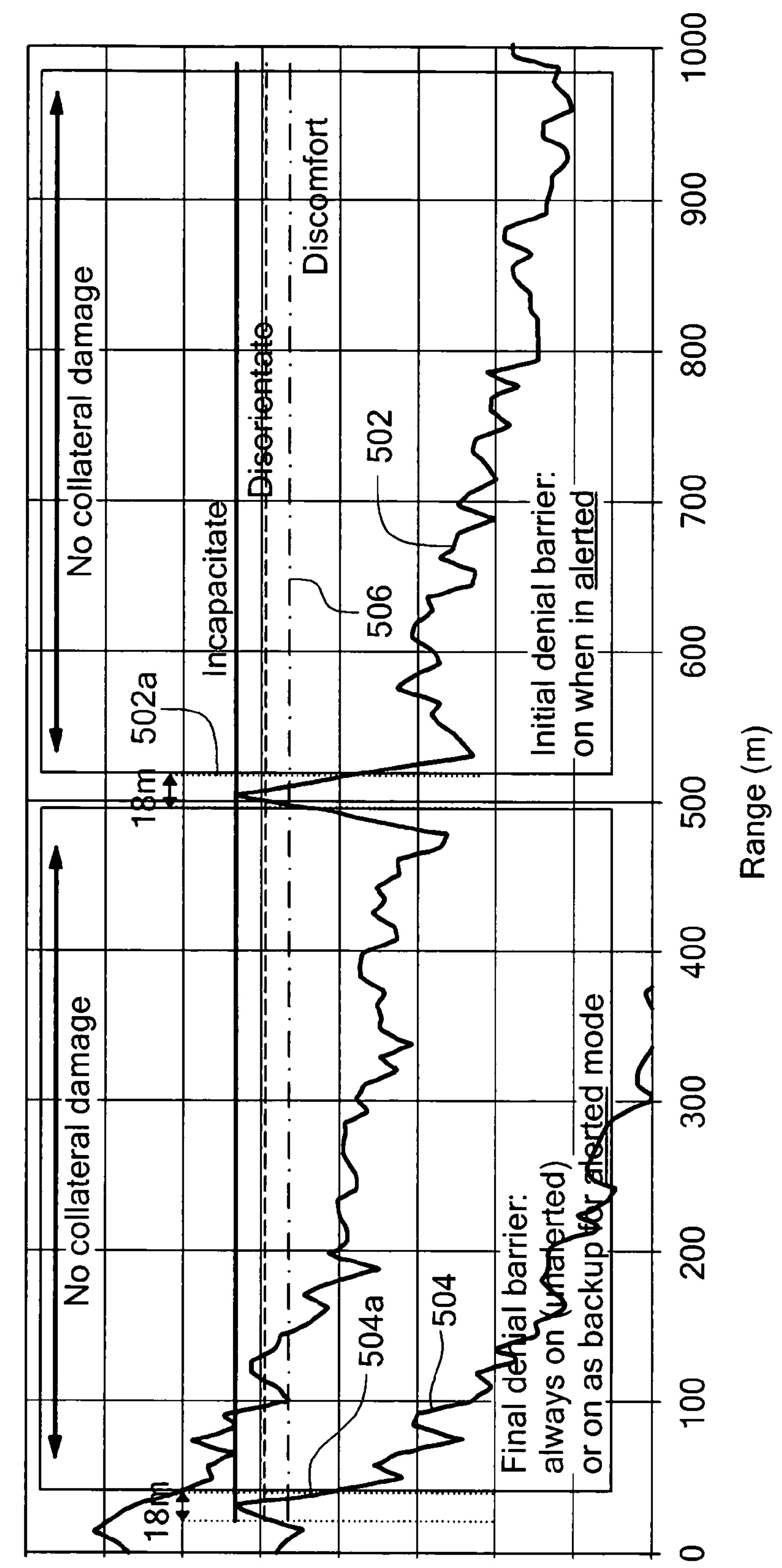
FIG. 5 is a graph showing simulated results as two curves; a first curve showing sound pressure level (SPL) versus range for a first time-reversed signal tailored for a far range transmitted by the high-peak-pressure-acoustic projector, and a second curve showing SPL versus range for a second time-reversed signal tailored for a close range transmitted by the high-peak-pressure-acoustic projector.

It is known that sound loses energy when bouncing off a surface as a function of sound frequency, grazing angle, surface roughness, and surface type. For example, sound bouncing from a mud ocean bottom at a high grazing angle, i.e., near ninety degrees, tends to lose substantial energy, while sound bouncing from a sandy ocean bottom at a low grazing angle tends to lose little energy. Sound bouncing from the ocean surface tends to lose little energy at all grazing angles if the sea state is relatively smooth but will lose more energy as the sea state increases roughness. As is further known, sound propagating in the ocean tends to bend in accordance with a change in sound velocity, which can change from place to place, or from time to time. Knowing the sound velocity profile, the water column depth, the sound frequency, the grazing angles, the surface roughness, the bottom roughness, and the bottom type, it is possible to generate acoustic models that can predict sound propagation. Modeling results are shown in FIG. 5.

Figure 3:
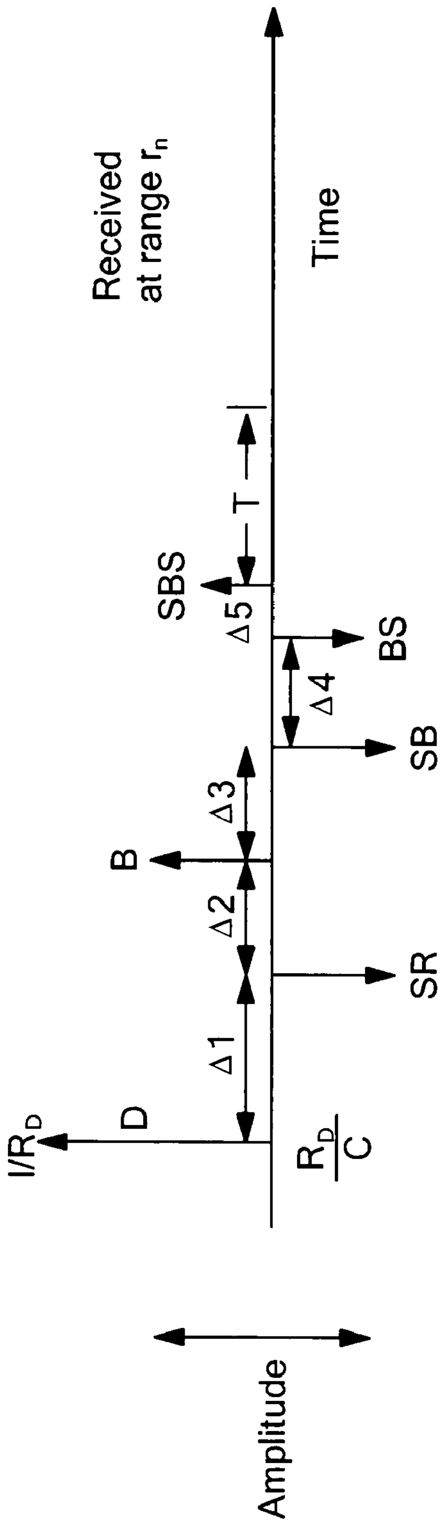
FIG. 3 is a chart showing sound arrival times and amplitudes associated with an acoustic impulsive signal generated at the POO of FIG. 2 and arriving at the position of the high-peak-pressure-acoustic projector of FIG. 2.

Referring now to FIG. 3, presuming the arrows represent the result of projecting a broadband impulse of sound (e.g., a sinc function impulse) transmitted at the POO of FIG. 2, the chart of FIG. 3 shows the impulse arriving at the position of the high-peak-pressure-acoustic projector (HPAP) of FIG. 2 at different times. It should be noted that each arrow, i.e., acoustic path, and each corresponding time delay are associated with a different acoustic path of FIG. 2. If the transmitted impulse is sufficiently short in duration (i.e., in physical extent), the arrivals will be distinct as shown. If the transmitted impulse is longer, the arrivals may smear together in time, resulting in a single longer received signal. The relative times between arrivals from different paths are indicated by A numbers, as also indicated in FIG. 2.

Relative phases of arrivals are shown as up or down arrows indicating a relative phase of zero or one hundred eighty degrees. As is known, when sound bounces off of a medium having a substantially different acoustic impedance than that of the water, e.g., the surface, the phase of the sound changes by one hundred eighty degrees. However, when sound bounces off of a medium having an acoustic impedance similar to that of the water, e.g., a muddy ocean bottom, the phase of the sound does not change as much due to the bounce. Therefore, it will be understood that paths having one surface bounce (SR, BS, SB) are received out of phase from other paths. The variety of paths tends to generate a complex acoustic transfer function between the POO and the position of the acoustic projector.

At high acoustic frequencies, sound absorption is strongly a function of distance. However, for the relatively low frequencies of interest and at the relatively short ranges of interest, sound absorption is not as significant a factor. For example, as described above, in one particular embodiment, the sound impulses transmitted by the low-peak-pressure-acoustic projector 28 correspond to a flat frequency spectrum band limited to about 250 Hz.

Figure 3A:
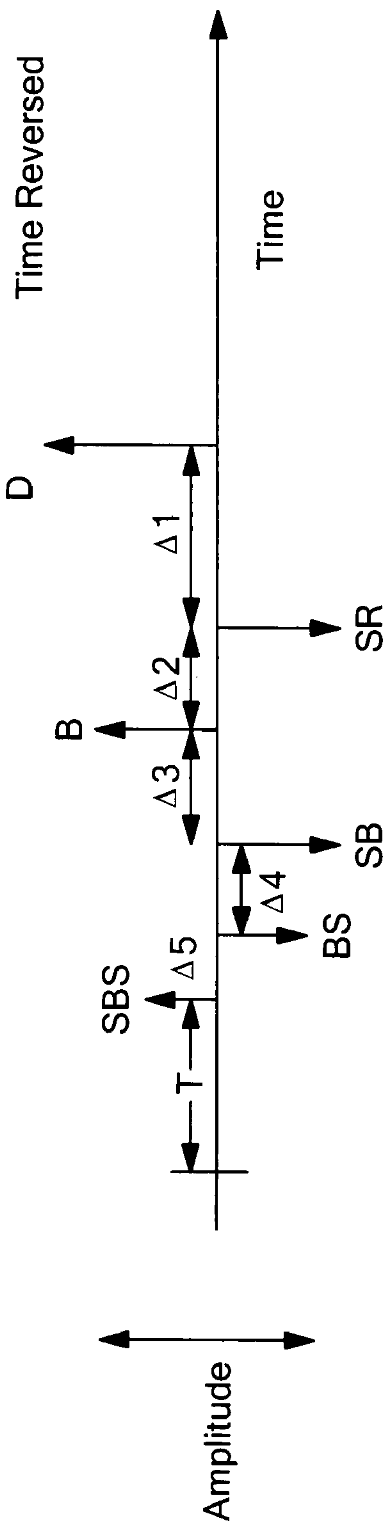
FIG. 3A is a chart showing a time-reversed signal associated with the sound arrivals of FIG. 3.
Figures 4, 4A:
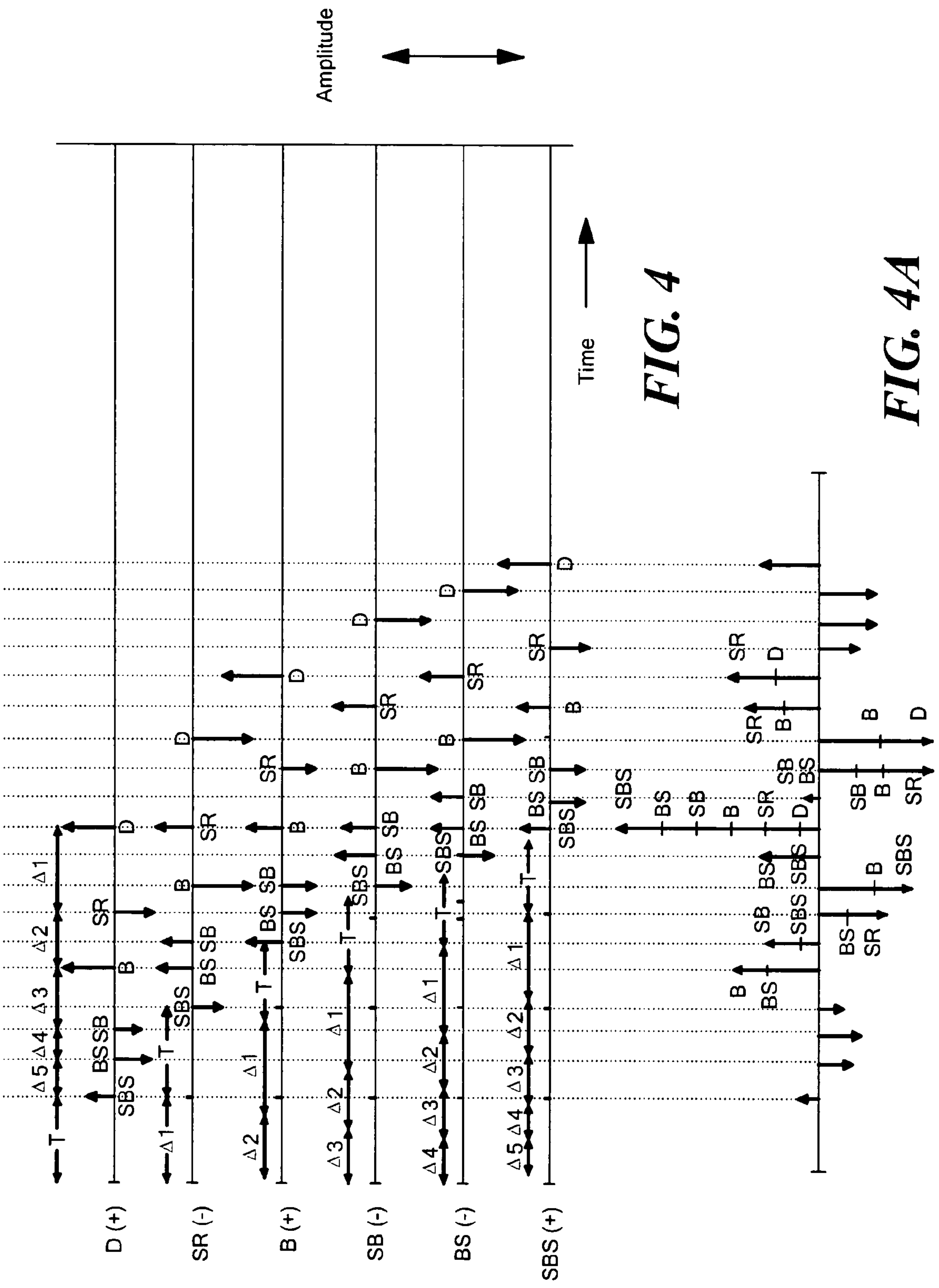
FIG. 4 is a chart showing sound arrivals from the time-reversed waveform of FIG. 3A generated at the position of the high-peak-pressure-acoustic projector of FIG. 2 and arriving at a predetermined location (which is at the POO of FIG. 2) along each of the acoustic paths shown in FIG. 2.
FIG. 4A is a chart showing the summation of sound of FIG. 4 at the predetermined location.

Referring now to FIG. 3A, a time-reversed signal is shown, where the arrivals of FIG. 3 are reversed in time. In FIGS. 4 and 4A it will be shown that transmission of the time-reversed signal by a high-peak-pressure-acoustic projector, for example, the high-peak-pressure-acoustic projector 42 of FIG. 1, results in an amplified signal at the predetermined location 31 of FIG. 1.

The time-reversed signal shown corresponds to a series of pulses in reverse order of arrival time compared to those received (FIG. 3). However, as described above, if the times of arrival of FIG. 3 were smeared in time, the time-reversed signal would be a single, longer signal, which would similarly be reversed in time.

Referring now to FIG. 4, the time-reversed signal of FIG. 3A, having a time-reversed sequence of pulses is shown as it propagates on each of the acoustic paths of FIG. 2, now in reversed direction, from the high-peak-pressure-acoustic projector of FIG. 2 to the predetermined location 31.

As expected for this example, the surface-bottom-surface (SBS) path has the longest time delay of $\Delta1+\Delta2+\Delta3+\Delta4+\Delta5$. Phases are affected as expected, reversing phase upon each surface bounce.

Referring now to FIG. 4A, the signals of FIG. 4 tend to add coherently at the location of the POO of FIG. 2, i.e., at the predetermined location 31 of FIG. 1. It can be seen that all of the pulses of the original time-reversed signal of FIG. 3A add in phase at the center of the chart to produce a high peak pressure sound pressure level and/or high impulse area at the predetermined location 31. The pulses do not add in phase at other locations. Therefore, the time-reversed signal of FIG. 3A provides the amplified sound at the predetermined location 31.

A similar effect would be generated if, as described above, the pulses of the received signal of FIG. 3 and the corresponding pulses of the time-reversed signal of FIG. 3A were smeared together in time. In that case, transmission of the time-reversed signal would similarly provide coherent addition at the position of the predetermined location 31.

While propagation in a channel bounded by the sea surface and sea bottom is described in conjunction with FIGS. 2-4A, the same principles apply to wave propagation in any medium and to any bounded wave channel, bounded in two or more dimensions, for which the boundaries reflect or scatter a wave field. For example, in another application, the wave channel can correspond to the interior of a building and the media can, therefore, be air.

Referring now to FIG. 5 a graph 500 has curves 502, 504 representing simulations of sound pressure level versus range for two different transmitted waveforms. The curve 502 represents transmission of a time-reversed acoustic signal (e.g., 34, FIG. 1) having a waveform shape corresponding to a range of five hundred three meters from a high-peak-pressure-acoustic projector, for example, the high-peak-pressure-acoustic projector 42 of FIG. 1. A region 502*a* at five hundred three meters has relatively high sound pressure level in a region having a range extent of approximately eighteen meters. A sound pressure level above a level 506 is capable of making an underwater swimmer very uncomfortable.

The curve 504 represents transmission of a time-reversed acoustic signal (e.g., 34, FIG. 1) having a waveform shape corresponding to a range of twenty-nine meters from the high-peak-pressure-acoustic projector 42. A region 504*a* at twenty-nine meters with a range extent of eighteen meters has a relatively high sound pressure level similar to that of the region 502*a,* and thus, has substantially the same effect.

The original sound pressure level transmitted by the high-peak-pressure-acoustic projector 42 is higher for the curve 502 than for the curve 504.

As described above in conjunction with FIG. 1, in one particular embodiment, the curve 502 can correspond to an alerted mode, and the curve 504 can correspond to a non-alerted mode.

It can be shown that at other ranges, apart from but proximate to the regions 502*a* and 504*a,* the sound pressure level (and peak pressure) is lower than that which would be achieved by transmitting a signal having a different type of waveform at high peak pressure. Therefore, at other ranges, humans and marine mammals are less affected than they would be by the signals having the other types of waveforms.

Figure 6:
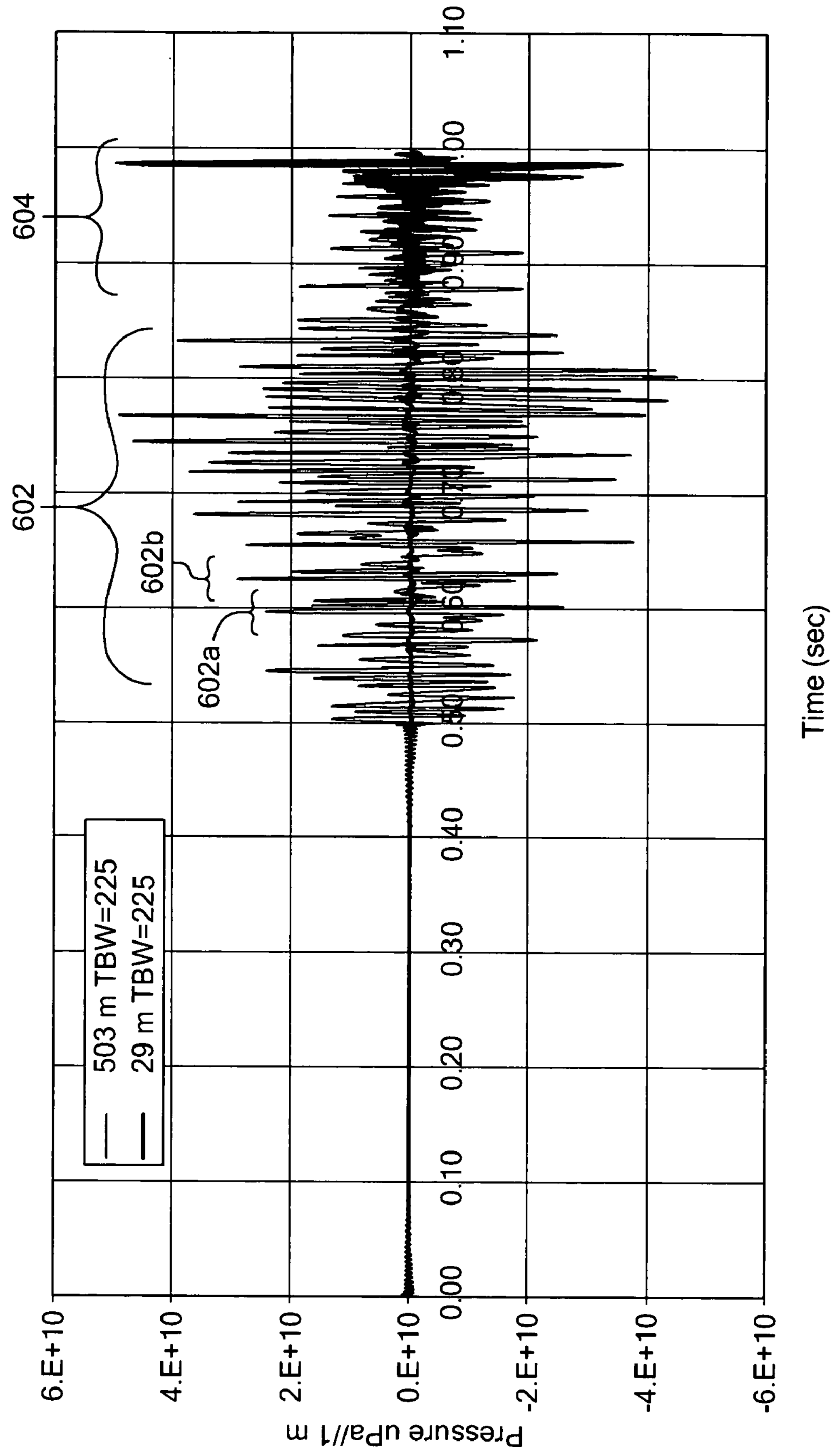
FIG. 6 is a graph showing the first and second time-reversed waveforms associated with FIG. 5 in the time domain used to generate the simulations of FIG. 5.

Referring now to FIG. 6, time-reversed signal 602 corresponds to a time domain signal projected into the water by the high-peak-pressure-acoustic projector 42 (FIG. 1), which results in the curve 502 of FIG. 5, and time-reversed signal 604 corresponds to a time domain signal projected into the water by the high-peak-pressure-acoustic projector 42, which results in the curve 504 of FIG. 5. It can be seen that some pulses (impulses), e.g., pulses 602*a,* 602*b,* are distinct in the time-reversed signal 602, while all pulse are smeared together in the time-reversed signal 604. This is the expected outcome, since the variety of paths between a POO and the high-peak-pressure-acoustic projector (e.g., between the POO and the high-peak-pressure-acoustic projector 42 of FIG. 1) have short relative time delays at short ranges, tending to smear together arrivals from the different acoustic paths.

Figure 7:
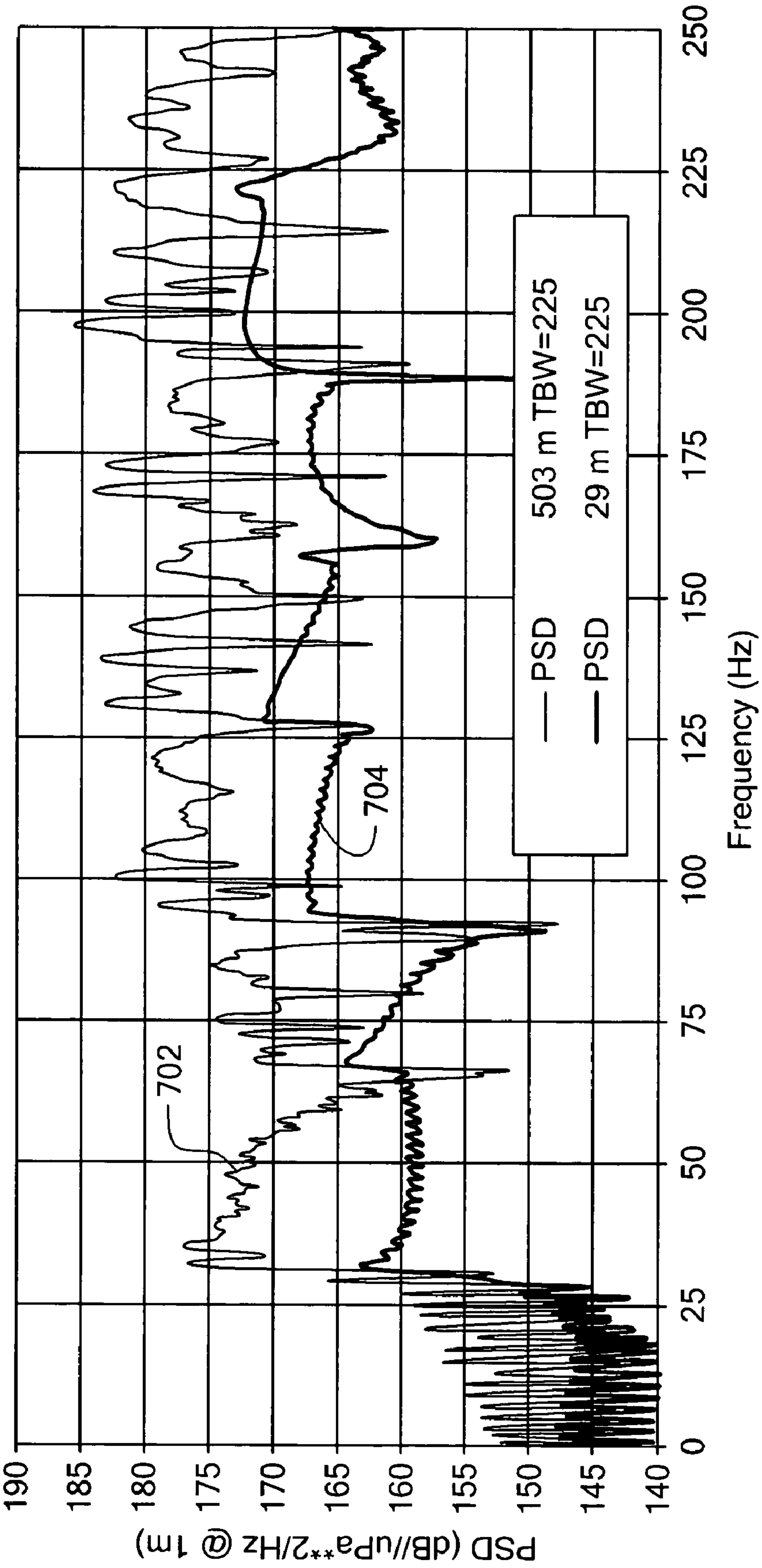
FIG. 7 is a graph showing the first and second time-reversed waveforms associated with FIG. 5 in the frequency domain used to generate the simulations of FIG. 5.

Referring now to FIG. 7, time-reversed signal 702 is a frequency domain signal corresponding to the time domain signal 604 of FIG. 6, which results in the curve 504 of FIG. 5, and time-reversed signal 704 is a frequency domain signal corresponding to the time domain signal 602 of FIG. 6, which results in the curve 506 of FIG. 5.

Figure 8:
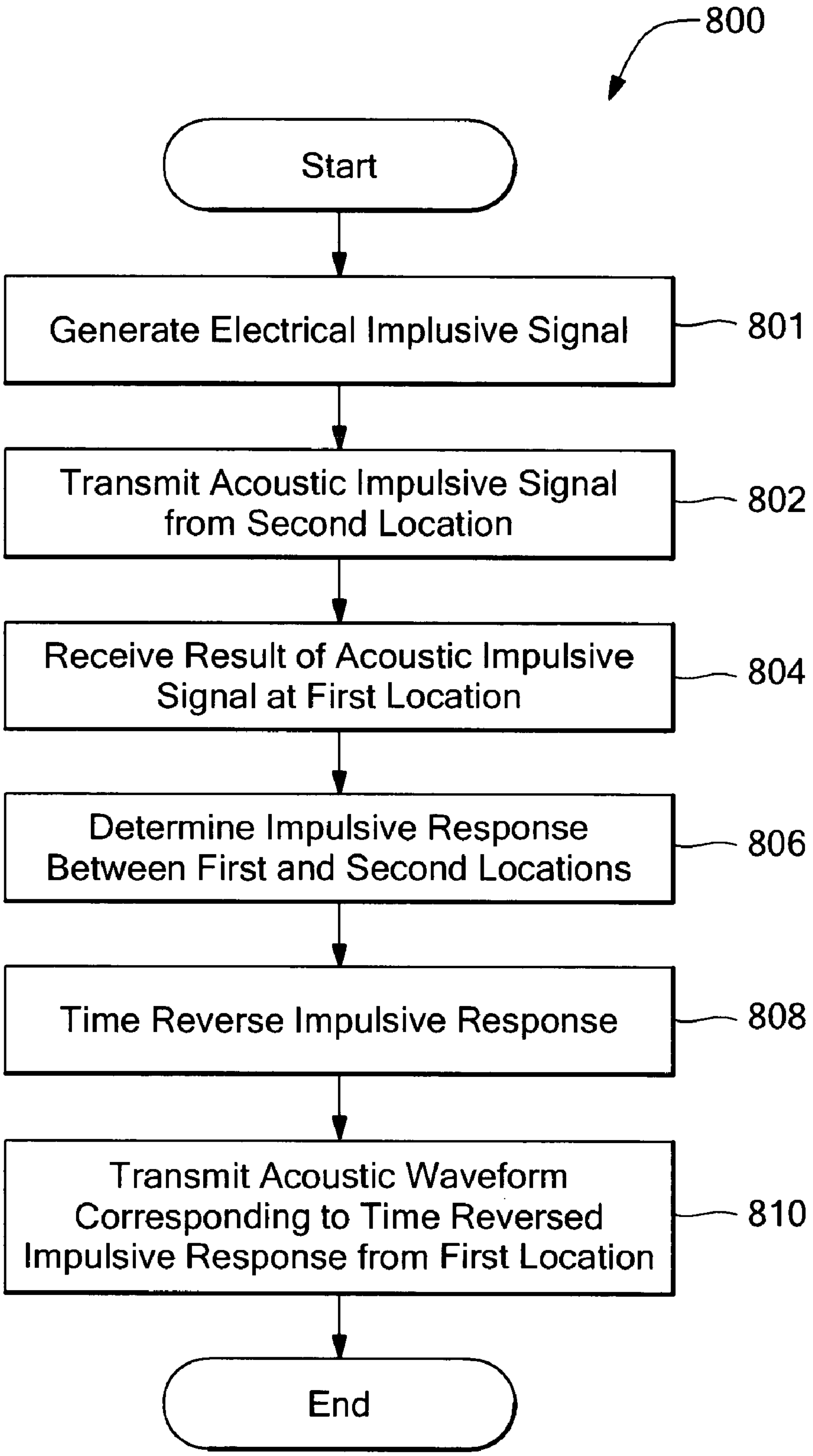
FIG. 8 is a flow chart showing a method of generating amplified sound with a relatively high sound pressure level at the predetermined location.
Figure 9:
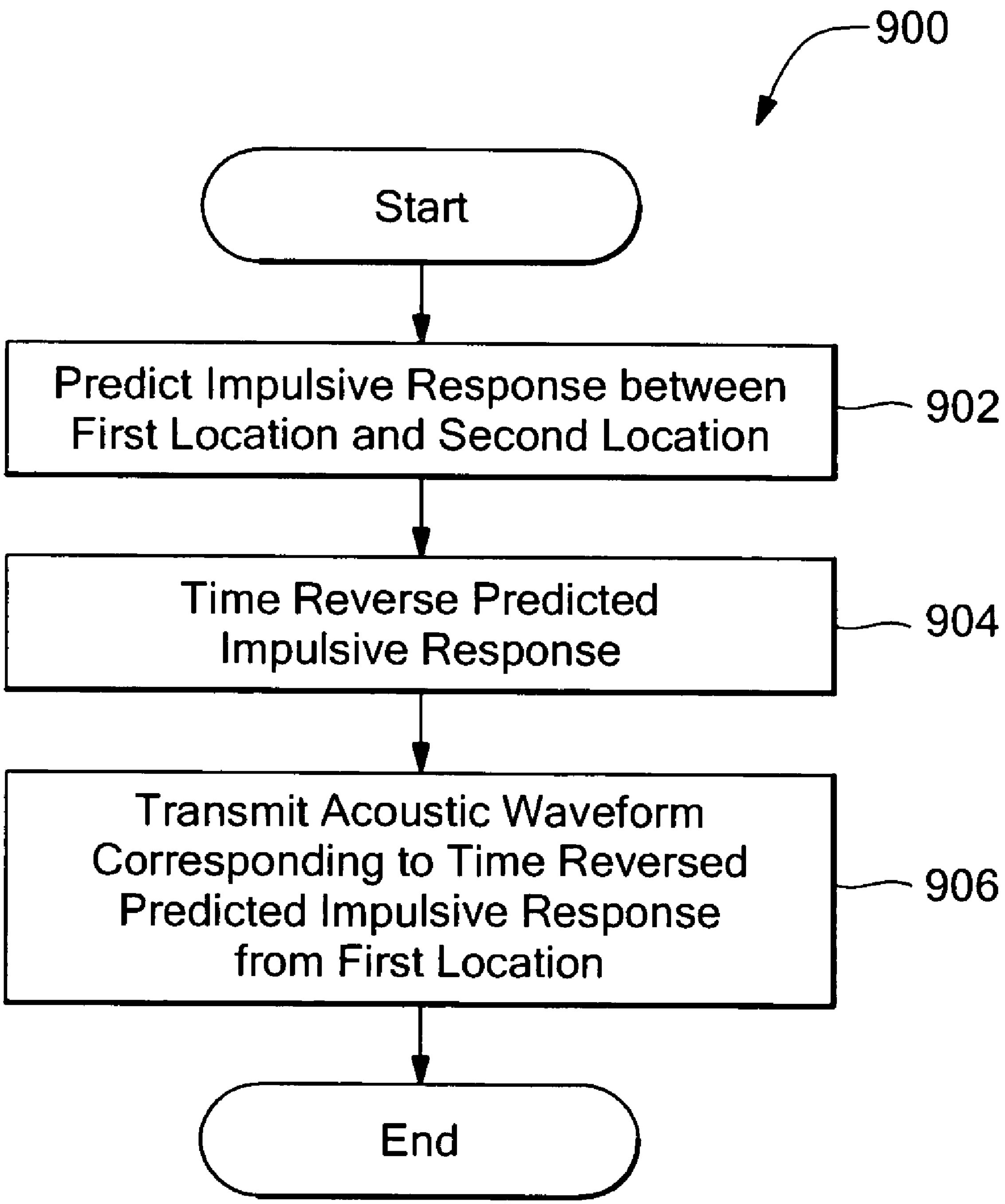
FIG. 9 is a flow chart showing another method of generating amplified sound with a relatively high sound pressure level at the predetermined location.

It should be appreciated that FIGS. 8 and 9 show flowcharts corresponding to the below contemplated techniques which would be implemented in the systems for swimmer denial 10, 150 (FIGS. 1, 1B) and the system 220 (FIG. 1D) for swimmer denial, respectively. The rectangular elements (typified by element 802 in FIG. 8), herein denoted "processing blocks," represent computer software instructions or groups of instructions. Diamond shaped elements, herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 8, a method 800 for swimmer denial can be used in conjunction with the system 100 of FIG. 1 and the system 150 of FIG. 1B. The method 800 begins at block 801, where a band limited electrical impulsive signal, for example, a sync function signal, is generated. At block 802, an acoustic impulsive signal is generated in accordance with the electrical impulsive signal from a second location, for example, from the second (predetermined) location 31 (POO) of FIG. 1. At block 804, sound is received at a first location after traveling via various acoustic paths, for example at the first location 41 (FIG. 1). At block 806, the impulsive response of the acoustic channel between the first and second locations is determined, for example, by the waveform processor 44 of FIG. 1. At block 808, the impulsive response determined at block 806 is time reversed, for example, by the waveform processor 44 of FIG. 1. At block 810 a signal corresponding to a time-reversed version of the impulsive response is transmitted at high peak pressure from the first location, for example, by the high-peak-pressure-acoustic projector 42 of FIG. 1, in order to achieve amplified sound at the second (predetermined) location, for example at the predetermined location 31 of FIG. 1.

As described above, since the acoustic channel between the first and second locations is generally reciprocal, in another embodiment, the impulsive signal of block 802 can be generated at the first location and received at block 804 at the second location. For similar reasons, the acoustic signal transmitted at block 810 can be transmitted at either the first or the second location and the amplified sound is received at the other location.

Referring now to FIG. 9, a process 900 can be used in conjunction with the system 220 of FIG. 1D. The method 900 begins at block 902, where an acoustic impulsive response between a first location and a second location is predicted. At block 904, the predicted impulsive response is time reversed. At block 906 an acoustic waveform is transmitted at the first location in accordance with the time reversed impulsive response generated at block 904, resulting in amplified sound at the second location.

As described above, the method and system of the present invention is not limited only to marine applications. While the method and system of the present invention are described above to apply to swimmer denial, it should be apparent that amplified sound can be achieved at a predetermined location whenever multi-path propagation conditions exists in any medium that supports wave type phenomena. For example, in a theater having wall reflections and multi-path sound propagation in air, it would be possible to generate amplified sound directed at one audience member, while reducing sound to other audience members. For another example, a home theater system could generate amplified sound at the position of one listener. The above method and system also apply to wave type phenomena traveling through a medium that is diffuse to wave propagation, having substantial scattering, for example the human body, as would be used, for example, in an ultrasound imaging system.

The method and system for swimmer denial are shown and described to provide amplified sound at a predetermined location in response to sound generated at a sound generating location apart from the predetermined location. The generated sound is the time-reversed impulsive response of the acoustic channel between the predetermined location and the sound generating location. However, as described in conjunction with equations shown in FIG. 1, in other applications, any other acoustic signal (other than an impulsive signal) can also be generated to obtain and acoustic transfer function for the other acoustic signal. The received sound can be time reversed and transmitted. While this arrangement could achieve a higher sound pressure level at the predetermined location 31, it may not have the characteristic of the rapid fall-off from that location that can be achieved using the impulsive response to an impulsive signal.

While advantages of the method and system for swimmer denial are described above in terms of denial of underwater swimmers, the system for swimmer denial can also be used to keep surface swimmers away from the high value asset.

While the method and system are described to be associated with swimmer denial, it will become apparent that the method and system by which amplified, i.e., focused, sound is provided at a predetermined location can also be used in other applications involving wave propagation phenomena in media other than water. The present invention applies to any application for which amplified sound is desired at a predetermined location apart from a sound projector. For example, amplified sound can be used in medical applications, for example, for gall stone destruction. For another example, amplified sound can be applied to seismic applications.

All references cited herein are hereby incorporated by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system to provide amplified sound at a predetermined location, comprising:

an impulsive signal generator adapted to provide an electrical impulsive signal;

a first acoustic projector coupled to the impulsive signal generator, disposed at a selected one of a first location and a second location, and adapted to transmit an acoustic impulsive signal in accordance with the electrical impulsive signal, wherein the acoustic impulsive signal has a time duration less than a time difference between two multipath sound arrivals for sound propagating between the first and second locations;

a hydrophone disposed at the unselected one of the first location and the second location and adapted to provide a hydrophone signal in response to the acoustic impulsive signal;

a waveform processor adapted to generate a time-reversed version of the hydrophone signal in accordance with a time-reversed acoustic impulsive response from the first location to the second location; and a second acoustic projector disposed at the first location and adapted to transmit an acoustic signal in accordance with the time-reversed version of the hydrophone signal, resulting in sound at the second location having at least one of a peak pressure substantially larger than a peak pressure apart from and proximate to the second location and an impulse area substantially larger than an impulse area apart from and proximate to the second location.

2. The system of claim 1, wherein the electrical impulsive signal has amplitude characteristics generally those of a sinc function signal.

3. The system of claim 2, wherein the sine function signal has a generally flat frequency spectrum band limited to about 250 Hz.

4. The system of claim 1, wherein the electrical impulsive signal has amplitude characteristics generally those of a Gaussian function signal.

5. The system of claim 1, wherein the electrical impulsive signal comprises a sinusoid signal.

6. The system of claim 1, wherein the waveform processor comprises:

an acoustic receiver adapted to receive and pre-process the hydrophone signal;

a waveform analyzer coupled to the acoustic receiver and adapted to digitize the pre-processed hydrophone signal as a digitized signal; and a time reversing processor adapted to time reverse the digitized signal as a digitized time-reversed signal.

7. The system of claim 6, wherein the waveform processor further comprises:

a waveform generator adapted to convert the digitized time-reversed signal to an analog time-reversed signal; and an amplifier adapted to amplify the analog time-reversed signal.

8. The system of claim 1, wherein the sound at the second location has a peak pressure larger than a peak pressure apart from and proximate to the second location by at least 3 dB re 1 μPa.

9. The system of claim 1, wherein the sound at the second location has at least one of a peak pressure and an impulse area sufficient to be uncomfortable to a human.

10. The system of claim 1, wherein the second location is separated from the first location by at least 10 meters and the sound peak pressure at the second location is at least 185 dB re 1 μPa.

11. The system of claim 1, wherein the second acoustic projector is adapted to transmit a plurality of time-reversed acoustic signals at a predetermined repetition rate, wherein selected ones of the plurality of time-reversed acoustic signals are in accordance with the time-reversed version of the hydrophone signal, and wherein the predetermined repetition rate is selected to cause discomfort to a human at the second location.

12. A method of generating amplified sound at a predetermined location, comprising:

generating an electrical impulsive signal;

transmitting an acoustic impulsive signal at a selected one of a first location and a second location in accordance with the electrical impulsive signal, wherein the acoustic impulsive signal has a time duration less than a time difference between two multipath sound arrivals for sound propagating between the first and second locations;

receiving sound pressure resulting from the acoustic impulsive signal at the unselected one of the first location and the second location;

determining an acoustic impulsive response from the first location to the second location in accordance with the received sound pressure;

time reversing the acoustic impulsive response; and transmitting an acoustic signal at the first location in accordance with the time-reversed acoustic impulsive response, resulting in sound at the second location having at least one of a peak pressure substantially larger than a peak pressure apart from and proximate to the second location and an impulse area substantially larger than an impulse area apart from and proximate to the second location.

13. The method of claim 12, wherein the electrical impulsive signal has amplitude characteristics generally those of a sinc function signal.

14. The method of claim 13, wherein the sinc function signal has a generally flat frequency spectrum band limited to about 250 Hz.

15. The method of claim 12, wherein the electrical impulsive signal has amplitude characteristics generally those of a Gaussian function signal.

16. The method of claim 12, wherein the electrical impulsive signal comprises a sinusoid signal.

17. The method of claim 12, wherein the sound at the second location has a peak pressure larger than a sound peak pressure apart from and proximate to the second location by at least 3 dB re 1 μPa.

18. The method of claim 12, wherein the sound at the second location has at least one of a peak pressure and an impulse area sufficient to be uncomfortable to a human.

19. The method of claim 12, wherein the second location is separated from the first location by at least 10 meters and the sound peak pressure at the second location is at least 185 dB re 1 μPa.

20. The method of claim 12, wherein the transmitting an acoustic signal comprises transmitting a plurality of acoustic signals at the first location at a predetermined repetition rate, wherein selected ones of the plurality of acoustic signals are in accordance with the time-reversed acoustic impulsive response, and wherein the predetermined repetition rate is selected to cause discomfort to a human at the second location.

21. A system to provide amplified sound at a predetermined location, comprising:

a waveform processor adapted to predict an acoustic impulsive response between a first location and a second location in accordance with an acoustic impulsive signal having a time duration less than a time difference between two multipath sound arrivals for sound propagating between the first and second locations and adapted to generate a time-reversed version of the acoustic impulsive response; and an acoustic projector disposed at the first location and adapted to transmit an acoustic signal in accordance with the time-reversed version of the acoustic impulsive response, resulting in sound at the second location having at least one of a peak pressure substantially larger than a peak pressure apart from and proximate to the second location and an impulse area substantially larger than an impulse area apart from and proximate to the second location.

22. The system of claim 21, wherein the waveform processor comprises:

an impulsive response prediction processor adapted to predict the acoustic impulsive response; and a time reversing processor coupled to the impulsive response prediction processor and adapted to generate the time-reversed version of the acoustic impulsive response.

23. The system of claim 22, wherein the waveform processor further comprises:

a waveform generator adapted to convert the time-reversed version of the acoustic impulsive response to an analog time-reversed signal; and an amplifier adapted to amplify the analog time-reversed signal.

24. The system of claim 21, wherein the sound peak pressure at the second location is larger than a sound peak pressure apart from and proximate to the second location by at least 3 dB re 1 μPa.

25. A method of generating amplified sound at a predetermined location, comprising:

predicting an acoustic impulsive response between a first location and a second location in accordance with an acoustic impulsive signal having a time duration less than a time difference between two multipath sound arrivals for sound propagating between the first and second locations;

time reversing the acoustic impulsive response; and transmitting an acoustic signal at the first location in accordance with the time-reversed acoustic impulsive response, resulting in sound at the second location having at least one of a peak pressure substantially larger than a peak pressure apart from and proximate to the second location and an impulse area substantially larger than an impulse area apart from and proximate to the second location.

26. The method of claim 25, wherein the sound at the second location has a peak pressure larger than a sound peak pressure apart from and proximate to the second location by at least 3 dB re 1 μPa.

* * * * *

UNITED STATES PATENT AND TRADEMARK OFFICE

CERTIFICATE OF CORRECTION

PATENT NO. : 7,254,092 B2
APPLICATION NO. : 11/095851
DATED : August 7, 2007
INVENTOR(S) : Frederick R. DiNapoli It is certified that error appears in the above-identified patent and that said Letters Patent is hereby corrected as shown below:

Column 9, line 61 delete “an” and replace with --and--.

Column 10, lines 11-12 delete “embodiments a” and replace with --embodiments, a--.

Column 11, line 58 delete “time reversing” and replace with --time-reversing--.

Column 11, line 67 delete “time reversing” and replace with --time-reversing--.

Column 12, line 15 delete “(FIG. 1) oi.e.,” and replace with --(FIG. 1) i.e.,--.

Column 14, lines 11-12 delete “will be become” and replace with --will become--.

Column 14, line 45 delete “A” and replace with --Δ--.

Column 15, line 3 delete “FIGS. 4 and 4A it” and replace with --FIGS. 4 and 4A, it--.

Column 15, line 48 delete “FIG. 5 a” and replace with --FIG. 5, a--.

Column 16, line 24 delete “pulse” and replace with --pulses--.

Column 16, line 65 delete “stated the” and replace with --stated, the--.

Column 17, line 17 delete “block 810 a” and replace with --block 810, a--.

Column 17, line 17 delete “block 906 an” and replace with --block 906, an--.

UNITED STATES PATENT AND TRADEMARK OFFICE

CERTIFICATE OF CORRECTION

PATENT NO. : 7,254,092 B2
APPLICATION NO. : 11/095851
DATED : August 7, 2007
INVENTOR(S) : Frederick R. DiNapoli It is certified that error appears in the above-identified patent and that said Letters Patent is hereby corrected as shown below:

Column 18, line 1 delete “and” and replace with --an--.

Column 18, lines 14-15 delete “sound is provided” and replace with --sound provided--.

Column 19, line 16 delete “time reversing processor” and replace with --time-reversing processor--.

Signed and Sealed this

Second Day of December, 2008

JON W. DUDAS
*Director of the United States Patent and Trademark Office*